US012153359B2

(12) United States Patent
Suzuki et al.

(10) Patent No.: US 12,153,359 B2
(45) Date of Patent: Nov. 26, 2024

(54) IMAGE FORMING APPARATUS

(71) Applicant: CANON KABUSHIKI KAISHA, Tokyo (JP)

(72) Inventors: Tomohiro Suzuki, Kanagawa (JP); Takeo Kawanami, Kanagawa (JP); Akinori Mitsumata, Tokyo (JP); Tomoya Tateishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/492,521

(22) Filed: Oct. 23, 2023

(65) Prior Publication Data

US 2024/0053692 A1 Feb. 15, 2024

Related U.S. Application Data

(63) Continuation of application No. 17/530,319, filed on Nov. 18, 2021, now Pat. No. 11,815,832.

(30) Foreign Application Priority Data

Nov. 27, 2020 (JP) ................................ 2020-197063

(51) Int. Cl.
*G03G 15/08* (2006.01)

(52) U.S. Cl.
CPC ..... *G03G 15/0894* (2013.01); *G03G 15/0874* (2013.01); *G03G 15/0879* (2013.01); *G03G 15/0886* (2013.01)

(58) Field of Classification Search
CPC ........... G03G 15/0886; G03G 15/0865; G03G 15/0877; G03G 21/1633
See application file for complete search history.

(56) References Cited

U.S. PATENT DOCUMENTS 5,121,165 A 6/1992 Yoshida
6,115,571 A 9/2000 Kobayashi
(Continued)

FOREIGN PATENT DOCUMENTS

CN 103838107 A 6/2014
CN 105974757 A 9/2016
(Continued)

OTHER PUBLICATIONS

Binghuan, W., "Discussion on the development of inkjet printing," 2019, pp. 44-48.

*Primary Examiner* — Jessica L Eley
(74) *Attorney, Agent, or Firm* — Canon U.S.A., Inc., IP Division

(57) ABSTRACT

An image forming apparatus is configured to allow a replenishment container to be detachably attached thereto. The image forming apparatus includes a drum unit including a photosensitive drum, and a development unit. The development unit includes a development roller, a reception portion configured to receive the replenishment container. The development unit is movable relative to the drum unit. The image forming apparatus further includes a housing including an opening/closing member movable between a cover position, at which the opening/closing member covers the reception portion, and an exposing position, at which the reception portion is exposed, and a support member configured to be movable between a support position, at which the support member supports the development unit, and a retracted position, at which the support member is retracted from the support position, in conjunction with the movement of the opening/closing member.

19 Claims, 17 Drawing Sheets

(56) References Cited

U.S. PATENT DOCUMENTS

| | | | | |
|---|---|---|---|---|
| 2007/0269227 | A1 | 11/2007 | Sato | |
| 2012/0263503 | A1 | 10/2012 | Nagashima | |
| 2014/0161491 | A1* | 6/2014 | Fukushima | G03G 21/1633 399/260 |
| 2018/0113414 | A1 | 4/2018 | Ando | |
| 2018/0143566 | A1* | 5/2018 | Kawasumi | G03G 15/0886 |

FOREIGN PATENT DOCUMENTS

| | | | |
|---|---|---|---|
| CN | 111352321 | A | 6/2020 |
| CN | 111580361 | A | 8/2020 |
| JP | 2002072653 | A | 3/2002 |
| JP | 2005221621 | A | 8/2005 |
| JP | 2008083639 | A | 4/2008 |
| JP | 2010237504 | A | 10/2010 |
| JP | 2014081602 | A | 5/2014 |
| JP | 2020154301 | A | 9/2020 |

* cited by examiner

IMAGE FORMING APPARATUS

CROSS-REFERENCE TO RELATED APPLICATIONS

The present application is a continuation of U.S. patent application Ser. No. 17/530,319, filed on Nov. 18, 2021, which claims priority from Japanese Patent Application No. 2020-197063 filed Nov. 27, 2020, which are hereby incorporated by reference herein in their entireties.

BACKGROUND

Field of the Disclosure

The present disclosure relates to an image forming apparatus using an electrophotographic method.

Description of the Related Art

Examples of an image forming apparatus include an electrophotographic copying machine, an electrophotographic printer (such as a light emitting diode (LED) printer, and a laser beam printer), a facsimile apparatus, and a word processor. The electrophotographic image forming apparatus forms an image on a recording medium by transferring a toner image formed on the surface of the photosensitive drum onto the recording medium.

An image forming apparatus with a toner replenishment system is known as an example of such an image forming apparatus. Japanese Patent Application Laid-Open No. 2020-154299 discusses a developer container to which a replenishment container containing a developer is detachably attachable.

SUMMARY

Aspects of the present disclosure provide an image forming apparatus that allows the replenishment container to be stably attached.

According to an aspect of the present disclosure, an image forming apparatus configured to perform an image forming operation on a recording medium and allow a replenishment container for replenishing toner to be detachably attached thereto includes a drum unit including a photosensitive drum, a development unit configured to be movable relative to the drum unit. The development unit includes a development roller, a reception portion configured to receive the replenishment container, and a containing portion for containing the toner replenished from the replenishment container. The image forming apparatus further includes a housing containing the drum unit and the development unit, the housing including an opening/closing member, the opening/closing member being movable between a cover position, at which the opening/closing member covers the reception portion, and an exposing position, at which the reception portion is exposed, and a support member configured to be movable between a support position, at which the support member supports the development unit, and a retracted position, at which the support member is retracted from the support position, in conjunction with the movement of the opening/closing member. The support member is located at the support position when the opening/closing member is located at the exposing position, and the support member is located at the retracted position when the opening/closing member is located at the cover position.

Further features of the present disclosure will become apparent from the following description of exemplary embodiments with reference to the attached drawings.

DESCRIPTION OF THE EMBODIMENTS

Figure 1:
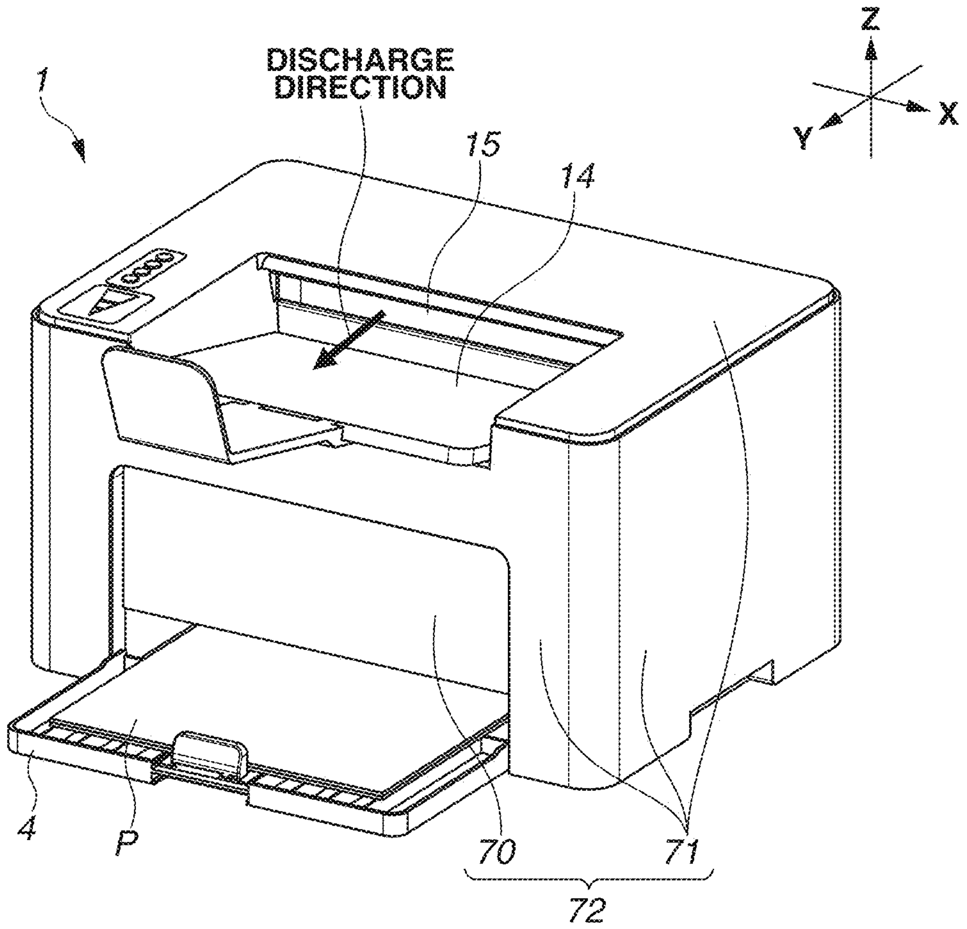
FIG. 1 is a perspective view of an image forming apparatus.

In the following description, some modes for carrying out the present disclosure will be described in detail by way of example based on exemplary embodiments thereof with reference to the drawings. However, the dimensions, the materials, the shapes, the relative layout, and the like of components that will be described in these exemplary embodiments should be changed as appropriate with the configuration of an apparatus to which the present disclosure is applied and various kinds of conditions. In other words, they are not intended to limit the scope of the present disclosure to the exemplary embodiments that will be described below. Further, in the drawings that will be used in the following description, some components may be omitted or partially omitted or some components may be simplified or partially simplified for facilitating the illustration.

<Overall Configuration of Image Forming Apparatus>

The overall configuration of an image forming apparatus 1 according to a first exemplary embodiment will be described. The image forming apparatus 1 according to the present exemplary embodiment is a monochrome laser beam printer that employs the electrophotographic process. The image forming apparatus 1 can perform an image forming operation that forms an image on a recording medium P using a developer (toner) based on image information transmitted from an external apparatus such as a personal computer. Examples of the recording medium P include recording paper, label paper, an overhead projector (OHP) sheet, and a cloth.

In the following description, the height direction (the direction opposite to the direction of gravitational force) of the image forming apparatus 1 with the image forming apparatus 1 installed on the horizontal surface is the Z direction. The direction intersecting with the Z direction and extending in parallel with the direction of the rotational axis (a main scanning direction) of a photosensitive drum 11, which will be described below, is the X direction. The direction intersecting with the X direction and the Z direction is the Y direction. Desirably, the X direction, the Y direction, and the Z direction perpendicularly intersect with one another. Further, for the sake of convenience, the positive side and the negative side in the X direction will be referred to as the right side and the left side, respectively. The positive side and the negative side in the Y direction will be referred to as the front side or the front surface side and the back side or the back surface side, respectively. The positive side and the negative side in the Z direction will be referred to as the upper side and the lower side, respectively. In the present exemplary embodiment, the Z direction is in parallel with the vertical direction, and the X direction and the Y direction are in parallel with the horizontal direction.

Figure 2:
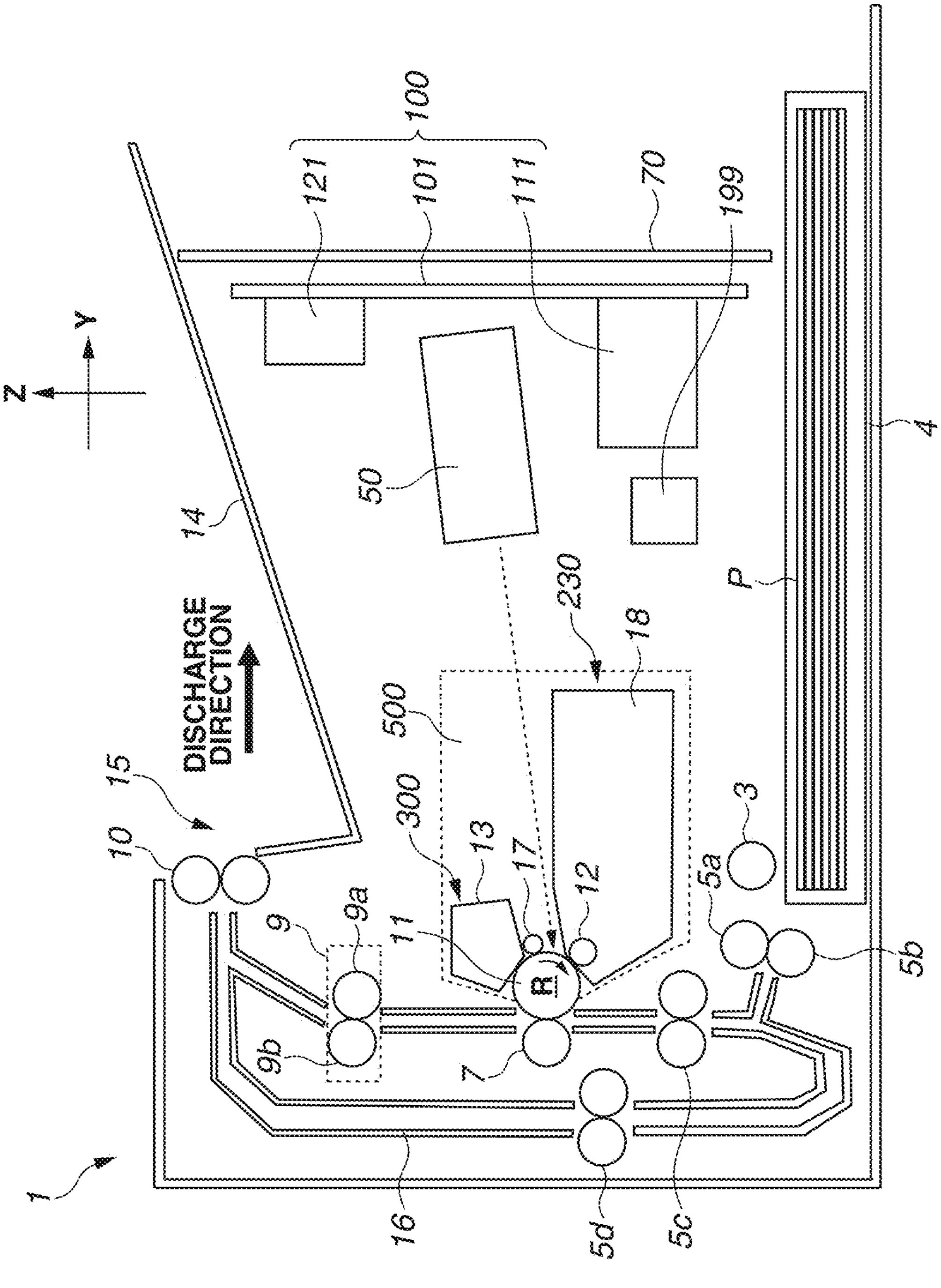
FIG. 2 illustrates the internal configuration of the image forming apparatus.

FIG. 1 illustrates a perspective view of the image forming apparatus 1, and FIG. 2 illustrates the internal configuration of the image forming apparatus 1 viewed in the X direction (the direction of the rotational axis of the photosensitive drum 11). FIG. 2 mainly illustrates members relating to the image forming process.

In FIG. 1, the image forming apparatus 1 includes a feeding tray 4, in which recording media P are stored, and a discharge tray (an opening/closing member) 14, on which discharged recording media P are stacked. The feeding tray 4 is can be pulled out in the Y direction, and a user can replenish recording media P therein. Each recording medium P with an image formed thereon after being fed from the feeding tray 4 is discharged from a discharge outlet 15 in the discharge direction illustrated in FIG. 1, and is stacked on the discharge tray 14. In the present exemplary embodiment, the discharge direction is in parallel with the Y direction.

A front cover 70 is provided as a part of the end surface (a part of the front surface) of the image forming apparatus 1 downstream in the discharge direction, and covers a circuit board 100. An exterior cover 71 covers a part of the front surface except for the portion covered with the front cover 70, and the side surfaces and the top surface of the image forming apparatus 1. The front cover 70 and the exterior cover 71, and the above-described discharge tray 14 form a first housing 72 of the image forming apparatus 1 together. Now, the housing 72 is a member that covers the entire image forming apparatus 1, and includes therein process members such as a scanner unit 50 and an image forming unit 500, which will be described below. The above-described discharge outlet 15 is an opening formed at a part of the housing 72, and the recording media P are discharged to the outside of the image forming apparatus 1 through this opening. The recording media P discharged from the discharge outlet 15 are stacked on an upper surface portion (a stacking portion) provided to the discharge tray 14.

The image forming apparatus 1 includes the image forming unit 500, which includes a photosensitive unit (a drum unit 300) and a development container (a development unit) 230. The image forming unit 500 is housed in the housing 72. The photosensitive unit 300 includes the photosensitive drum 11 and a charging roller (a charging member) 17. The development unit 230 includes a containing portion 18 for containing toner replenished from a replenishment pack 210, which will be described below, and a development roller 12. The photosensitive drum 11 is an image bearing member to bear an electrostatic latent image thereon. The development roller 12 is a developer bearing member to bear the toner as a developer thereon. The development roller 12 develops the electrostatic latent image formed on the photosensitive drum 11 using the toner. In the present exemplary embodiment, the development roller 12 develops the electrostatic latent image with the development roller 12 in contact with the photosensitive drum 11.

As described above, the housing 72 houses the image forming unit 500 (the drum unit 300 and the development unit 230), and includes the discharge tray 14. The exterior cover 71 and the front cover 70 of the housing 72 can also be referred to as a main body frame member that houses the image forming unit 500 (the drum unit 300 and the development unit 230). The discharge tray 14 is attached to the main body frame member (more specifically, the exterior cover 71).

A procedure of an image forming operation on a recording medium P will be described with reference to FIG. 2. In response to the transmission of the image information to the image forming apparatus 1, the photosensitive drum 11, which is a rotational member, is rotationally driven at a predetermined circumferential speed (a process speed) in the direction indicated by an arrow R based on a print start signal. The scanner unit 50 emits laser light to the photosensitive drum 11 based on the input image information. The scanner unit 50 includes a laser oscillator to output laser light, a polygonal mirror and a lens for irradiating the photosensitive drum 11 with the laser light, a scanner motor for rotating the polygonal mirror, and a frame that supports these members. The photosensitive drum 11 is charged by the charging roller 17 in advance, and allows the electrostatic latent image to be formed thereon by being irradiated with the laser light. After that, the toner contained in the containing portion 18 is conveyed to the photosensitive drum 11 by the development roller 12, by which this electrostatic latent image is developed and a toner image is formed on the photosensitive drum 11.

Each recording medium P is fed from the feeding tray 4 in parallel with the above-described image forming process. A pickup roller 3, a feeding roller 5*a*, and a conveyance roller pair 5*c* are provided on the conveyance path of the image forming apparatus 1. The pickup roller 3 contacts the recording medium P at the top in the feeding tray 4, and rotates to feed the recording medium P. The feeding roller 5*a* and a separation roller 5*b* in pressure contact therewith form a separation nip. If two or more recording media P are simultaneously fed to the separation nip due to the influence of a frictional force between the recording media P, the feeding roller 5*a* and the separation roller 5*b* separate the recording media P from one another, and feed the one at the top downstream.

The recording medium P fed from the feeding tray 4 is conveyed toward a transfer roller 7 by the conveyance roller pair 5*c*. The toner image formed on the photosensitive drum 11 is transferred onto the recording medium P by a transfer bias applied to the transfer roller 7. The recording medium P with the toner image transferred thereon by the transfer roller 7 is heated under pressure in a fixing device 9, by which the toner image is fixed to the recording medium P. The fixing device 9 includes a heating roller 9*a*, which includes a fixing heater therein, and a pressing roller 9*b*, which is biased toward the heating roller 9*a*. Then, the recording medium P with the toner image fixed thereon is discharged onto the discharge tray 14 by a discharge roller pair 10.

To form images on the both sides of the recording medium P, the discharge roller pair 10 switches back the recording medium P with image formed on a first side thereof to guide the recording medium P to a two-sided conveyance path 16. The recording medium P guided to the two-sided conveyance path 16 is conveyed toward the transfer roller 7 again by a two-sided conveyance roller pair **5*d* and the conveyance roller pair 5*c*. An image is formed on a second side as the back side of the first side of the recording medium P via the transfer roller 7, and then the recording medium P is discharged onto the discharge tray 14**.

After the toner image is transferred onto the recording medium P, the toner remaining on the photosensitive drum 11 is removed by a cleaning unit 13.

As illustrated in FIG. 2, the image forming apparatus 1 includes the circuit board 100. The circuit board 100 includes a wiring board 101 made with an insulator, and electronic components 111 and 121 soldered to the wiring board 101. Conductor wires electrically connected to the electronic components 111 and 121 are arranged on and inside the plate of the wiring board 101. The circuit board 100 has, for example, the function of converting an alternating current supplied from the outside of the image forming apparatus 1 into a direct current, and the function of converting an input voltage to supply a predetermined voltage value for the image forming process.

As illustrated in FIG. 2, the circuit board 100 is disposed with the surface of the wiring board 101 provided with the electronic components 111 and 121 thereon facing in the discharge direction. Further, the wiring board 101 is provided between the front cover 70 and the scanner unit 50 in the discharge direction. The electronic components 111 and 121 are disposed on one surface of the wiring board 101, the one surface facing the scanner unit 50.

Further, the image forming apparatus 1 includes a control unit (a central processing unit (CPU) or an arithmetic device) 199. The control unit 199 controls the operation of the image forming apparatus 1, thereby performing the image forming operation on the recording media P.

As will be described below, the replenishment pack (a toner containing container or a replenishment container) 210 for replenishing the toner is detachably attachable to the image forming apparatus 1. The image forming apparatus 1 and the replenishment pack 210 can be collectively referred to as an image forming system.

<Layout and Configuration of Replenishment Unit>

Next, the replenishment unit 200 will be described with reference to FIGS. 3, 4, 5, 6A and 6B, 7, and 8A and 8B. The replenishment unit 200 is to be attached to the image forming apparatus 1.

The replenishment pack 210, which will be described below, is attachable to the replenishment unit 200 (refer to FIGS. 10A and 10B) to replenish the toner to the containing portion 18. This allows toner supply from the outside of the image forming apparatus 1 to the containing portion 18 without taking the containing portion 18 with less remaining toner therein off from the housing 72.

Figure 3:
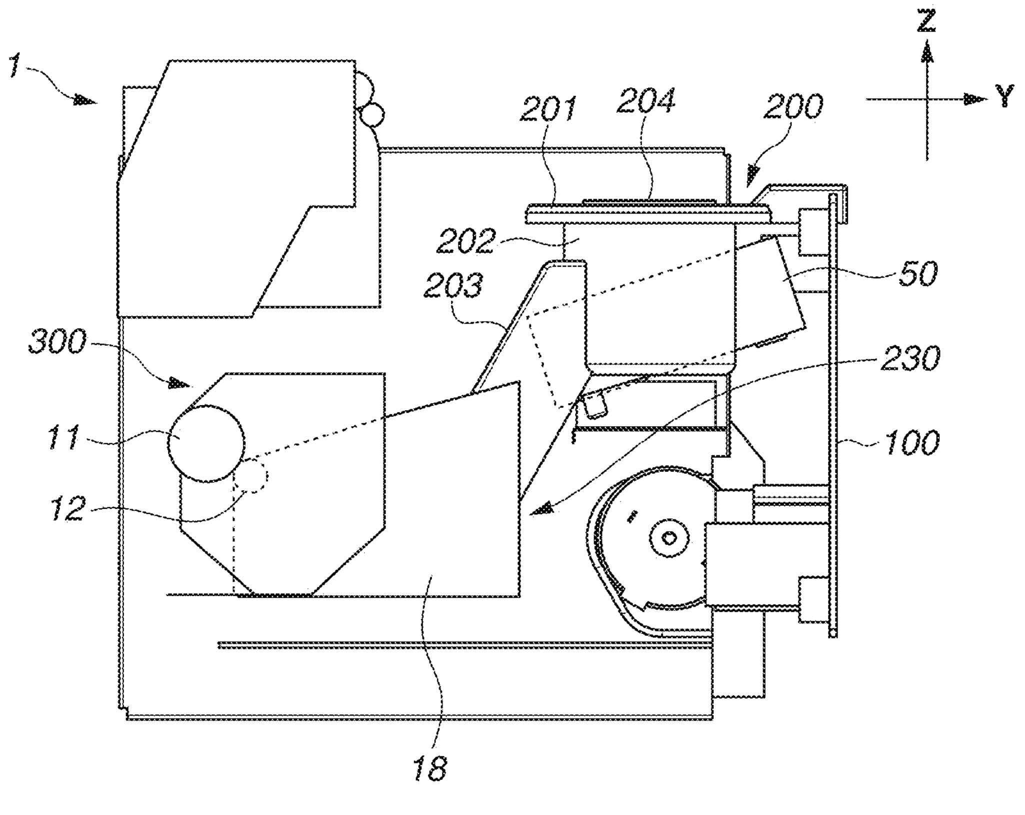
FIG. 3 is a side view of the image forming apparatus for illustrating the layout of a replenishment unit.
Figure 4:
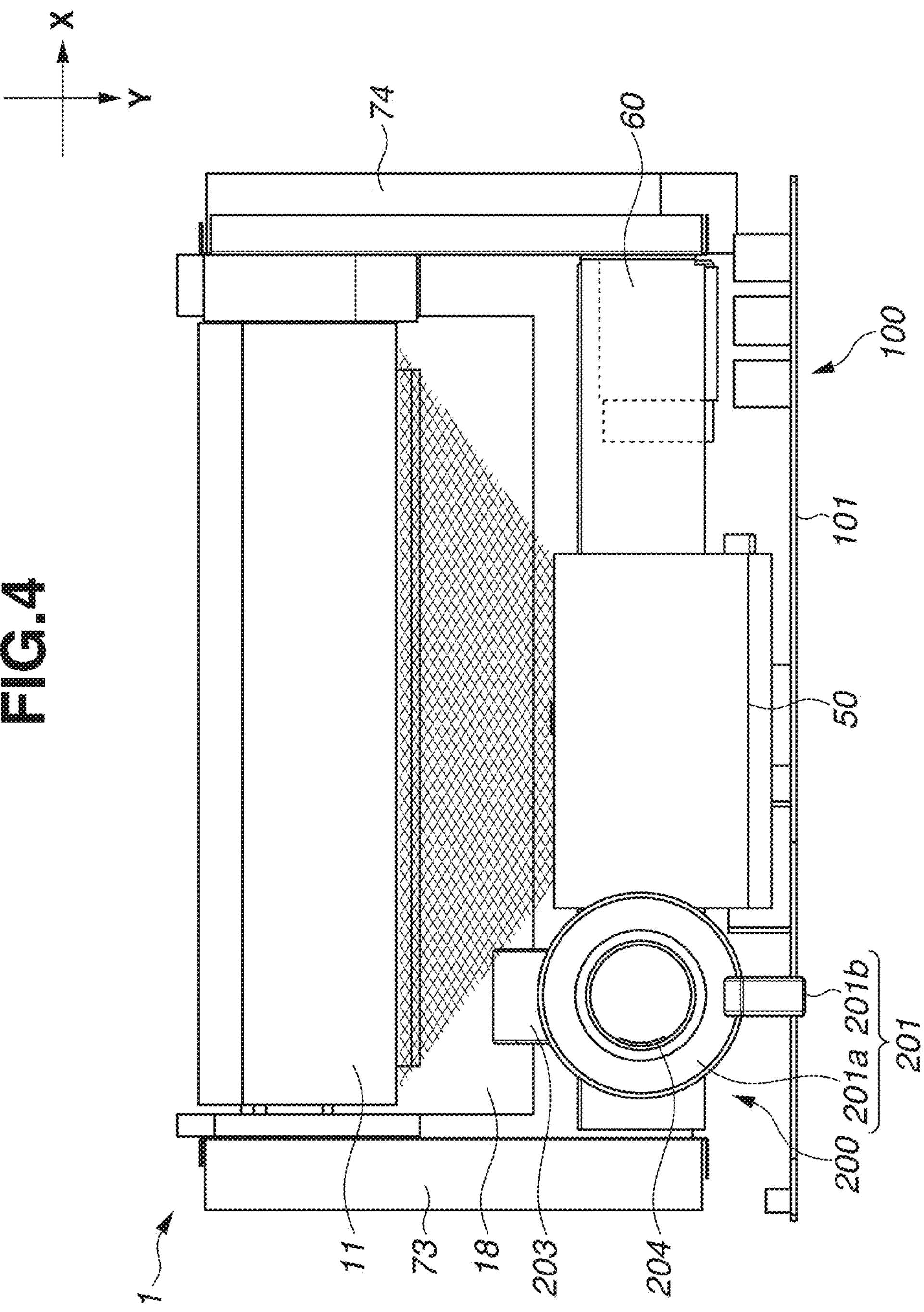
FIG. 4 is a top view of the image forming apparatus.

FIG. 3 is a side view of the image forming apparatus 1 illustrating the layout of the replenishment unit 200. FIG. 3 is a side view of the image forming apparatus 1 viewed in the direction of the rotational axis of the photosensitive drum 11. FIG. 3 illustrates the inside of the image forming apparatus 1 with the exterior cover 71 and a left-side plate frame 73 at least partially omitted. FIG. 4 is a top view of the image forming apparatus 1 with the exterior cover 71 removed therefrom.

The replenishment unit 200 includes an attachment portion 201, to which the replenishment pack 210 (not illustrated in FIG. 3) is attached, a cylindrical toner reception portion (a receiving portion or a receiver portion) 202, and a replenishment channel 203, which connects the containing portion 18 and the toner reception portion 202.

The toner reception portion 202 and the replenishment channel 203 in the replenishment unit 200 are included in the development unit 230. The attachment portion (an operation portion or a shutter movement portion) 201 is included in the housing 72. The replenishment pack 210 is receivable to the toner reception portion 202 and the attachment portion 201.

The development unit 230 has the function as a reception unit (a support unit or a receiver unit) to receive the replenishment pack 210. The reception unit includes the toner reception portion 202, and the replenishment pack 210 is detachably attachable to the reception unit.

In the present exemplary embodiment, the development unit 230 is movable relative to the photosensitive unit 300. That means that the toner reception portion 202, the replenishment channel 203, and the containing portion 18 are movable relative to the photosensitive unit 300. In other words, the development unit 230 is movable relative to the photosensitive drum 11 or the housing 72 with the development unit 230 lying in the housing 72. That also means that the toner reception portion 202, the replenishment channel 203, and the containing portion 18 are movable relative to the photosensitive drum 11 or the housing 72.

The attachment portion 201 is located on the top surface portion 240 (which will be described below with reference to FIGS. 9A and 9B), and a replenishment inlet 204, which is an opening for replenishing the toner, is formed therein. The toner replenished from the replenishment pack 210 passes through the replenishment inlet 204, moves in the order of the toner reception portion 202 and the replenishment channel 203, and is eventually supplied to the containing portion 18.

FIG. 4 is a top view of the image forming apparatus 1 with the exterior cover 71 removed therefrom. As described above, the replenishment inlet 204 is formed in the attachment portion 201. Further, the attachment portion 201 includes a ring portion **201*a* disposed surrounding the replenishment inlet 204, and a lever portion 201*b* connected to the ring portion 201*a*. As illustrated in FIG. 4, the width of the replenishment unit 200 in the X direction is shorter than the width of the containing portion 18 in the X direction. The replenishment unit 200 is disposed outside the region irradiated with the laser emitted from the scanner unit 50 (a cross-hatched portion in FIG. 4**).

Figure 5:
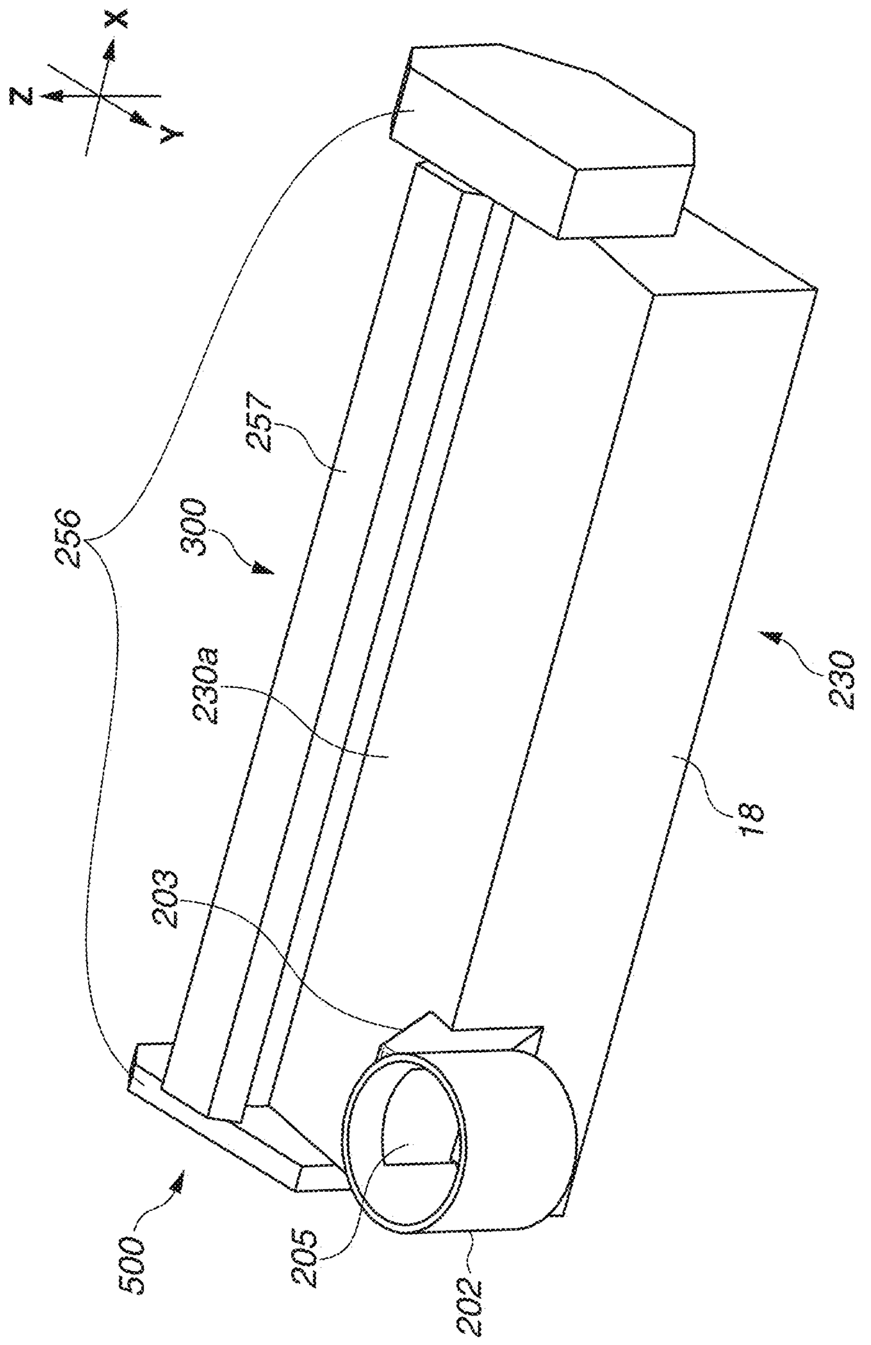
FIG. 5 is a perspective view of an image forming unit.

FIG. 5 is a perspective view of the image forming unit 500. The image forming unit 500 includes the development unit 230 and the photosensitive unit 300. The attachment portion 201 of the replenishment unit 200 and a part of members associated therewith are omitted in FIG. 5.

As illustrated in FIG. 5, a side-surface opening (a reception port) 205 communicating with the replenishment channel 203 is formed in the inner wall of the cylindrical toner reception portion 202. A space for containing the toner is provided inside the toner containing portion 18. A toner path connecting the side-surface opening 205 of the toner reception portion 202 and the space inside the containing portion 18 is formed inside the replenishment channel 203.

The toner passes from the toner reception portion 202 through this side-surface opening 205 to the replenishment channel 203, and then passes through the replenishment channel 203 and then is put into the containing portion 18.

The development unit 230 includes a frame member 230*a* including the containing portion 18, the toner reception portion 202, and the replenishment channel 203. In other words, the containing portion 18, the toner reception portion 202, and the replenishment channel 203 are a part of the frame member 230*a* of the development unit 230. The frame member 230*a* supports the development roller 12, which is rotatable. The containing portion 18, the toner reception portion 202, and the replenishment channel 203 may be integrally formed.

As illustrated in FIG. 5, the photosensitive unit 300 includes side covers (side wall portions or side wall frame members) 256 and a connection frame member 257 connecting the side covers 256. Further, the side covers 256 support the photosensitive drum 11, which is rotatable. The side covers 256 and the connection frame member 257 can be referred to as a frame member of the photosensitive unit 300. In other words, the side covers 256 and the connection frame member 257 are a part of the frame member of the photosensitive unit 300. The side covers 256 and the connection frame member 257 may be integrally formed.

In the present exemplary embodiment, the frame member 230*a* of the development unit 230 is movably coupled with the frame member (the side covers 256 in the present exemplary embodiment) of the photosensitive unit 300.

Figure 6B:
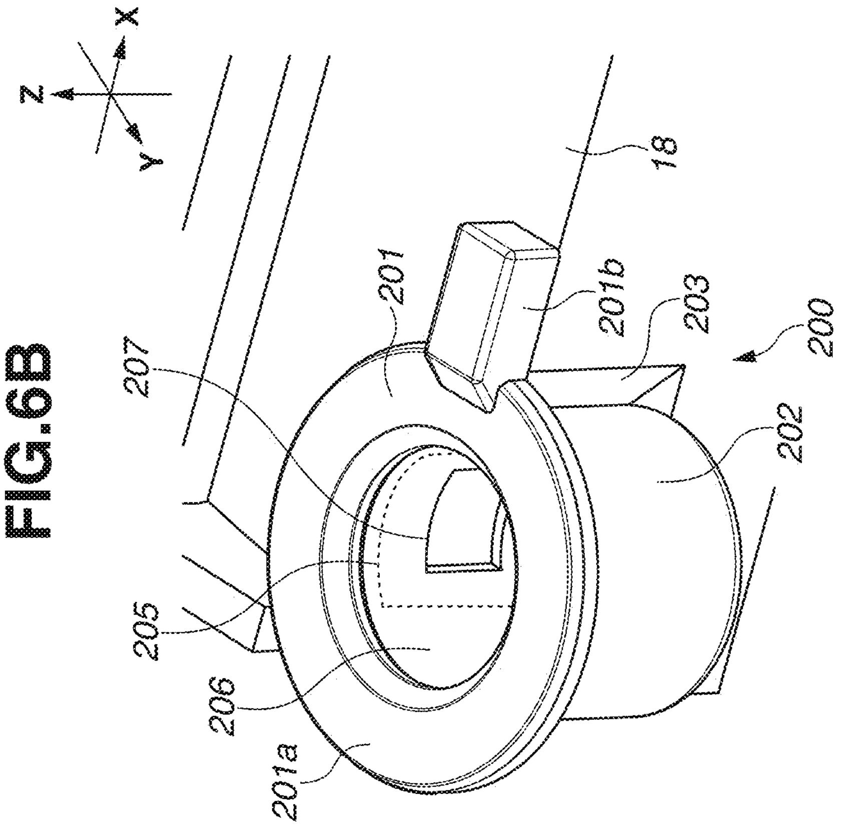
FIGS. 6A and 6B are enlarged perspective views of the replenishment unit.
Figure 6A:
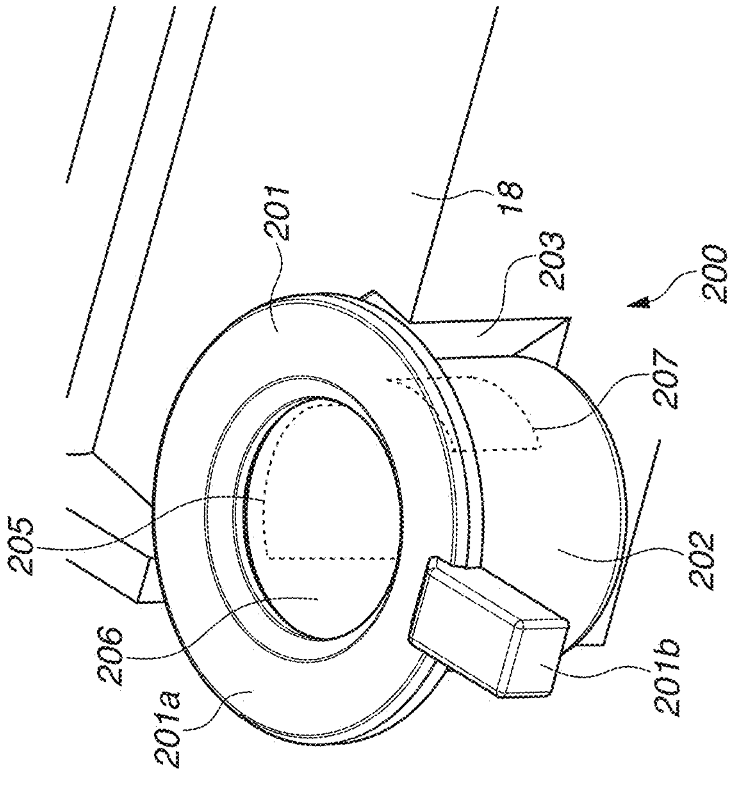

FIGS. 6A and 6B are enlarged perspective views of the replenishment unit 200. FIG. 6A is an enlarged perspective view of the replenishment unit 200 with the side-surface opening 205 covered with a main body shutter portion 206. FIG. 6B is an enlarged perspective view of the replenishment unit 200 with the main body shutter portion 206 moved and the side-surface opening 205 exposed.

In FIG. 6A, the side-surface opening 205, indicated by the dotted line, formed in the toner reception portion 202 is blocked with the main body shutter portion 206 and actually invisible. The main body shutter portion 206 is a cylindrical member concentric with the toner reception portion 202, and is provided on the inner side of the toner reception portion 202. The main body shutter portion 206 also has an opening 207 used for the toner to pass therethrough, but the opening 207, indicated by the dotted line, is actually located at an invisible position. In FIG. 6A, the side-surface opening 205 and the opening 207 are positioned out of alignment with each other, by which the main body shutter portion 206 closes the side-surface opening 205.

As will be described below, with the replenishment pack 210 attached to the replenishment unit 200, the main body shutter portion 206 is movable in conjunction with the movement of the attachment portion 201. Further, the replenishment unit 200 without the replenishment pack 210 thereon causes the main body shutter portion 206 not to be moved even if the attachment portion 201 is moved.

With the replenishment pack 210 attached to the replenishment unit 200, a rotation of the lever portion 201*b* by approximately 90° from the position illustrated in FIG. 6A to the position illustrated in FIG. 6B rotates the main body shutter portion 206 inside the toner reception portion 202. In FIG. 6B, the side-surface opening 205 and the opening 207 are positioned in alignment with each other, opening the side-surface opening 205, allowing the toner to be replenished via the side-surface opening 205.

In the image formation performed on a recording medium P, the toner is stirred in the containing portion 18 with a not-illustrated stirring member with the side-surface opening 205 closed. That prevents the toner from leaking out of the side-surface opening 205. The lever portion 201*b* thus is moved to the position illustrated in FIG. 6A in the image formation. This position will be referred to as an initial position of the lever portion 201*b*. On the other hand, in replenishing the toner from the replenishment pack 210, which will be described below, into the containing portion 18, the side-surface opening 205 is opened. The lever portion 201*b* thus is moved to the position illustrated in FIG. 6B in the toner replenishment. This position will be referred to as a replenishment position of the lever portion 201*b*.

Figure 7:
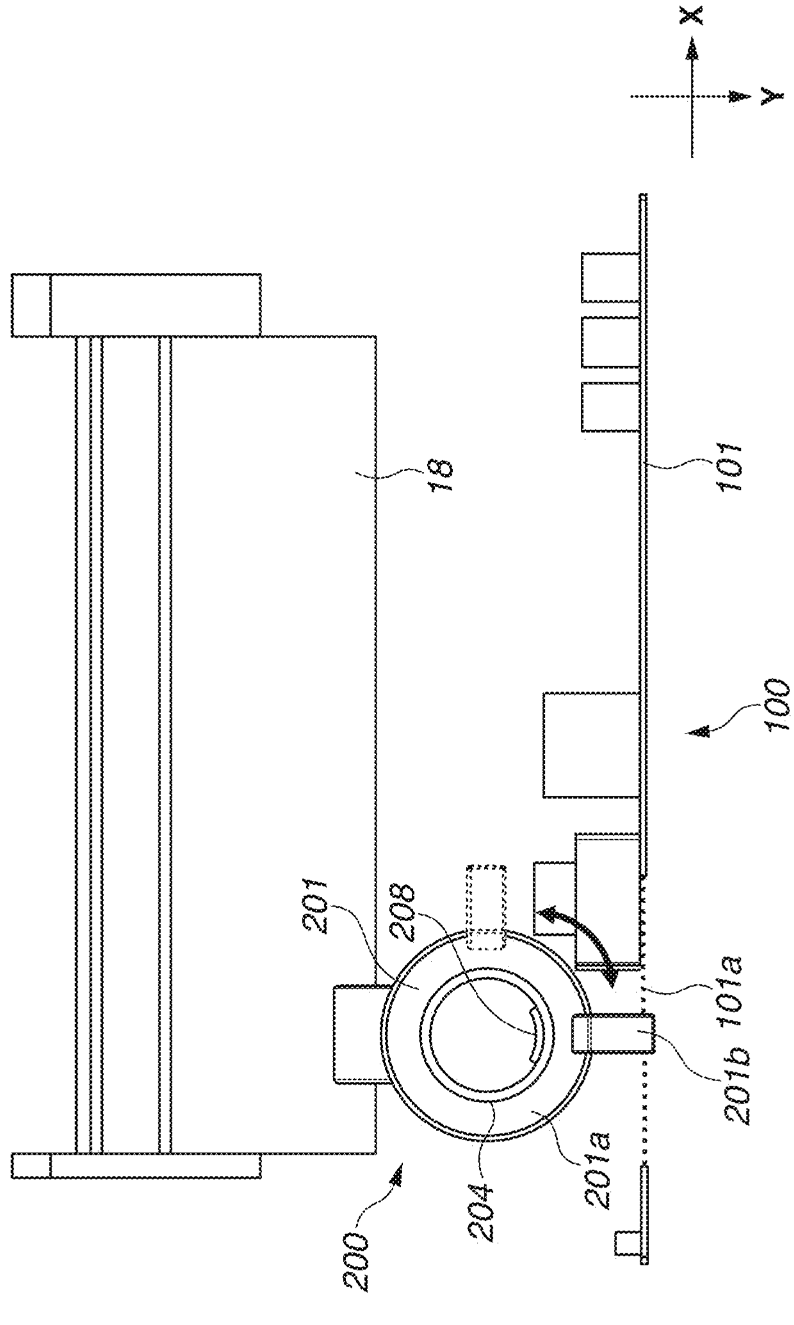
FIG. 7 is a top view of the image forming apparatus.

FIG. 7 is a top view of the image forming apparatus 1. As illustrated in FIG. 7, a protrusion 208 is provided on the inner side of the replenishment unit 200. The function of the protrusion 208 will be described in detail below. Further, an extended portion 101*a* of the wiring board 101 overlaps the lever portion 201*b* at the initial position as viewed in the vertical direction.

<Configuration of Replenishment Container>

Next, the configuration of the replenishment pack 210 (the replenishment container) will be described with reference to FIGS. 8A and 8B.

Figure 8A:
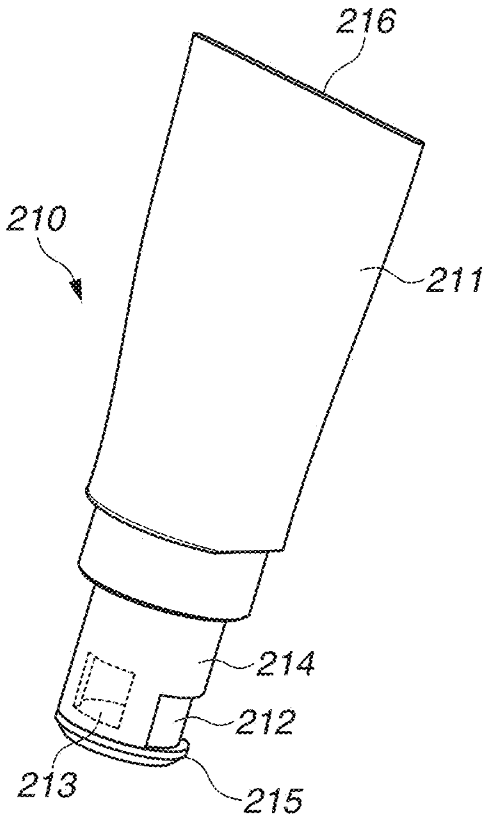
FIGS. 8A and 8B are perspective views of a replenishment pack.
Figure 8B:
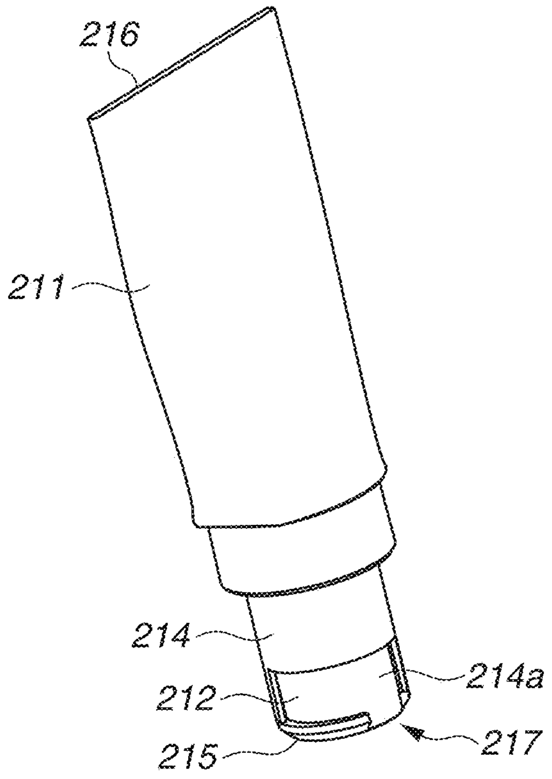

FIGS. 8A and 8B are perspective views of the replenishment pack 210. FIG. 8B is a perspective view of the replenishment pack 210 as viewed in a direction different from that of FIG. 8A.

The replenishment pack 210 includes a container portion (a replenishment toner containing portion or a pouch portion) 211, in which the toner to be replenished is contained, and a cylindrical insertion portion 212, which is to be inserted into the replenishment inlet 204. An opening 213 as a discharge port for discharging the toner contained in the pouch portion 211 is provided in the side surface of the insertion portion 212. Further, the replenishment pack 210 includes a shutter portion (a first shutter) 214, which covers the opening 213, which is openable and closable. As the replenishment pack 210 is attached to the replenishment port 200, the insertion portion 212 and the shutter portion 214 are inserted in the toner reception portion 202 and the attachment portion 201.

Further, the replenishment pack 210 includes a pack bottom portion 215, which is fixed to the insertion portion 212. Further, the pouch portion 211 extends opposite to the insertion portion 212. A pouch end portion 216, which extends in a predetermined direction, is formed at the end of the pouch portion 211.

The shutter portion 214 is a cylindrical member concentric with the insertion portion 212, and is provided on the outer side of the insertion portion 212. The shutter portion 214 is rotatable relative to the insertion portion 212. Further, the shutter portion 214 includes an exposure portion 214*a*, which allows the toner to be discharged from the replenishment pack 210 and replenished to the image forming apparatus 1 with the exposure portion 214*a* of the shutter portion 214 and the opening 213 of the insertion portion 212 in alignment with each other, which is caused by the rotation of the shutter portion 214.

In FIG. 8A, the opening 213, indicated by the dotted line, formed in the insertion portion 212 is covered with the shutter portion 214 and actually invisible. As illustrated in FIG. 8B, a recessed portion 217 is formed in the pack bottom portion 215. The function of the recessed portion 217 will be described in detail below.

<Procedure for Attaching Replenishment Container>

Next, a procedure of replenishing the toner using the replenishment pack 210 will be described with reference to FIGS. 9A and 9B, 10A and 10B, and 11.

Figure 9A:
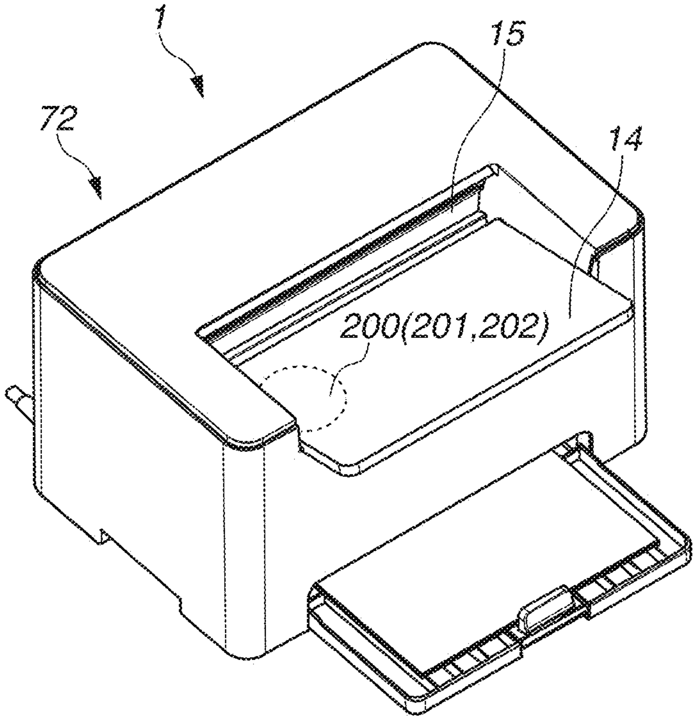
FIGS. 9A and 9B are perspective views of the image forming apparatus.
Figure 9B:
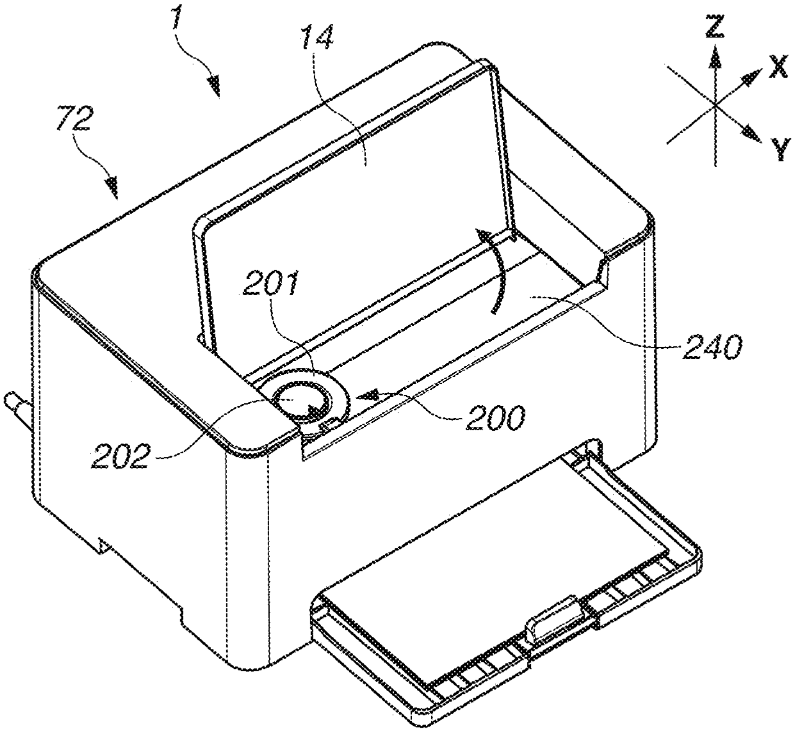

FIGS. 9A and 9B are perspective views of the image forming apparatus 1. FIG. 9A is a perspective view of the image forming apparatus 1 with the discharge tray 14 located at the closed position. FIG. 9B is a perspective view of the image forming apparatus 1 with the discharge tray 14 located at the opened position.

Figure 10A:
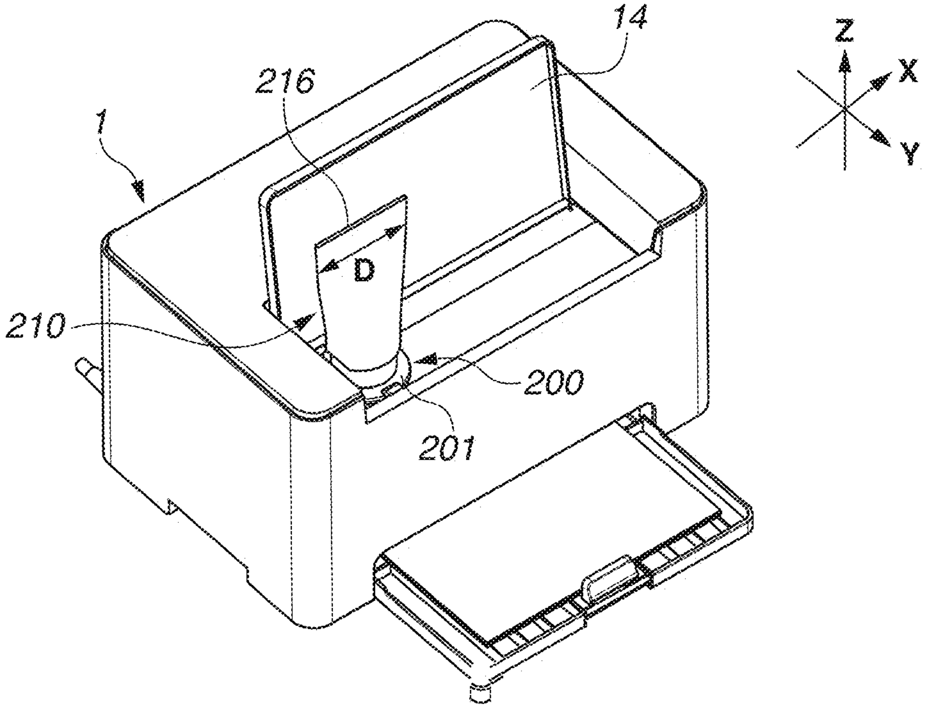
FIGS. 10A and 10B are perspective views of the image forming apparatus.
Figure 10B:
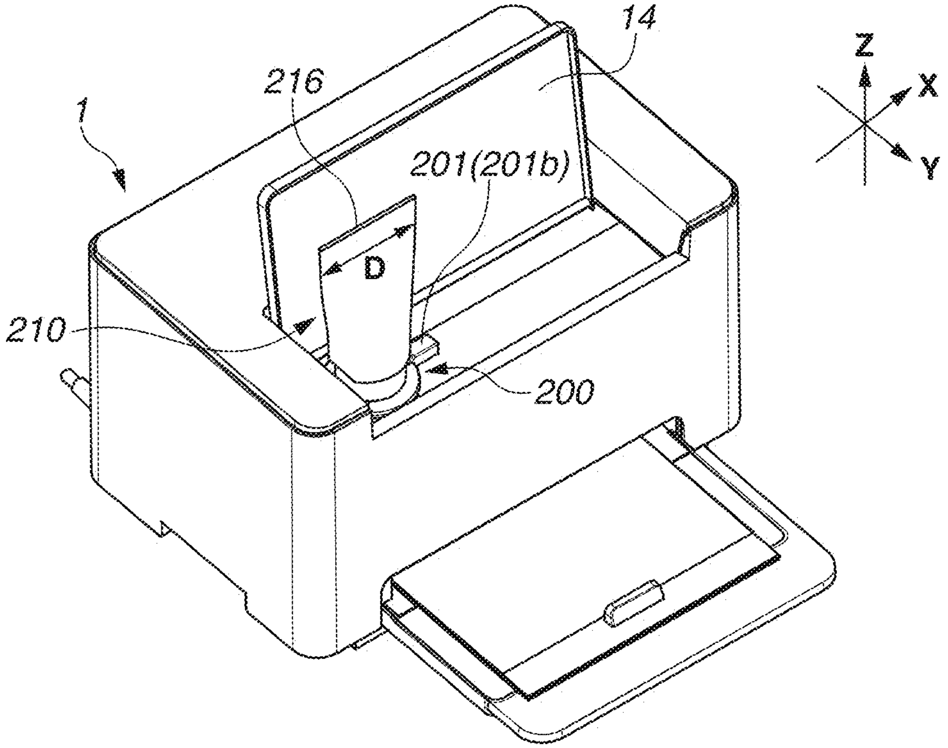

FIGS. 10A and 10B are perspective views of the image forming apparatus 1. FIG. 10A illustrates the image forming apparatus 1 with the replenishment pack 210 put in the replenishment unit 200. FIG. 10B illustrates the image forming apparatus 1 with the replenishment pack 210 put in the replenishment unit 200 and the attachment portion 201 moved.

In the present exemplary embodiment, the discharge tray 14 is movable between the closed position (the stacking position, or the cover position), at which the recording media P discharged from the discharge outlet 15 are stackable thereon, and an exposing position (the opened position), at which the replenishment unit 200 is exposed. As illustrated in FIG. 9A, with the discharge tray 14 at the closed position, the discharge tray 14 covers the attachment portion 201 and the toner reception portion 202 of the replenishment unit 200. As illustrated in FIG. 9B, with the discharge tray 14 at the exposing position, the attachment portion 201 and the toner reception portion 202 of the replenishment unit 200 are exposed.

The replenishment unit 200 is disposed at the upper portion of the front surface of the main body of the image forming apparatus 1, offering easy access to the user in replenishment.

In toner replenishment, the recording media P stacked on the discharge tray 14 is removed, and the discharge tray 14 is opened to the opened position illustrated in FIG. 9B. With the discharge tray 14 open, the replenishment unit 200, the top surface portion 240 adjacent to the replenishment unit 200, and the attachment portion 201 and the toner reception portion 202 of the replenishment unit 200 are exposed.

Then, as illustrated in FIG. 10A, the replenishment pack 210 is inserted into the replenishment unit 200. In this state, the replenishment pack 210 is put in the replenishment inlet 204 of the attachment portion 201 and received in the toner reception portion 202.

The replenishment pack 210 is inserted into the replenishment unit 200 in such a manner that the recessed portion 217 (refer to FIG. 8B) on the replenishment pack 210 is fitted to the protrusion 208 (refer to FIG. 7) on the replenishment unit 200. If the pack bottom portion 215 comes in contact with the protrusion 208, at which the recessed portion 217 is not fitted to the protrusion 208, the replenishment pack 210 is not inserted.

In the present exemplary embodiment, the replenishment pack 210 can be inserted into the replenishment unit 200 with a longitudinal direction D of the pouch end portion 216 in parallel with the X direction as illustrated in FIG. 10A.

With the replenishment pack 210 inserted into the bottom of the replenishment unit 200, the main body shutter portion 206 (FIGS. 6A and 6B) of the replenishment unit 200 and the shutter portion 214 (FIGS. 8A and 8B) of the replenishment pack 210 are engaged with each other. Further, the shutter portion 214 of the replenishment pack 210 is engaged with the attachment portion 201. In this state, the movement of the attachment portion 201 allows the shutter portion 214 to be opened, and thus the main body shutter portion 206 is opened with the shutter portion 214.

FIG. 10B illustrates the image forming apparatus 1 with the lever portion 201*b* moved from the initial position to the replenishment position. With the lever portion 201*b* moved from the initial position to the replenishment position, the replenishment pack 210 is restricted from being moved relative to the replenishment unit 200 in the direction (the Z direction in the present exemplary embodiment) opposite to the attachment direction by a not-illustrated lock mechanism.

As described above, the movement of the lever portion 201*b* rotates the main body shutter portion 206 included in the replenishment unit 200. Further, the engagement of the main body shutter portion 206 of the replenishment unit 200 with the shutter portion 214 of the replenishment pack 210 allows the shutter portion 214 to be rotated together with the main body shutter portion 206. In other words, the attachment portion 201 is a shutter movement portion to move the main body shutter portion 206 via the shutter portion 214.

The movement of the lever portion 201*b* to the replenishment position causes the side-surface opening 205 (FIGS. 6A and 6B) in the toner reception portion 202 and the opening 213 (FIGS. 8A and 8B) formed in the insertion portion 212 to be opened together. The side-surface opening 205 in the toner reception portion 202 and the opening 213 in the insertion portion 212 are at positions where they face each other at the timing that the replenishment pack 210 is inserted into the replenishment unit 200. The movement of the lever portion 201*b* from the initial position to the replenishment position rotates the shutter portion 214 with the insertion portion 212 fixed to the toner reception portion 202, causing the side-surface opening 205 to communicate with the opening 213. This enables the toner to be replenished from the replenishment pack 210 into the containing portion 18 via the replenishment unit 200. In the present exemplary embodiment, the user can promote the discharge of the toner from the replenishment pack 210 by compressing and thus deforming the pouch portion 211.

Figure 11:
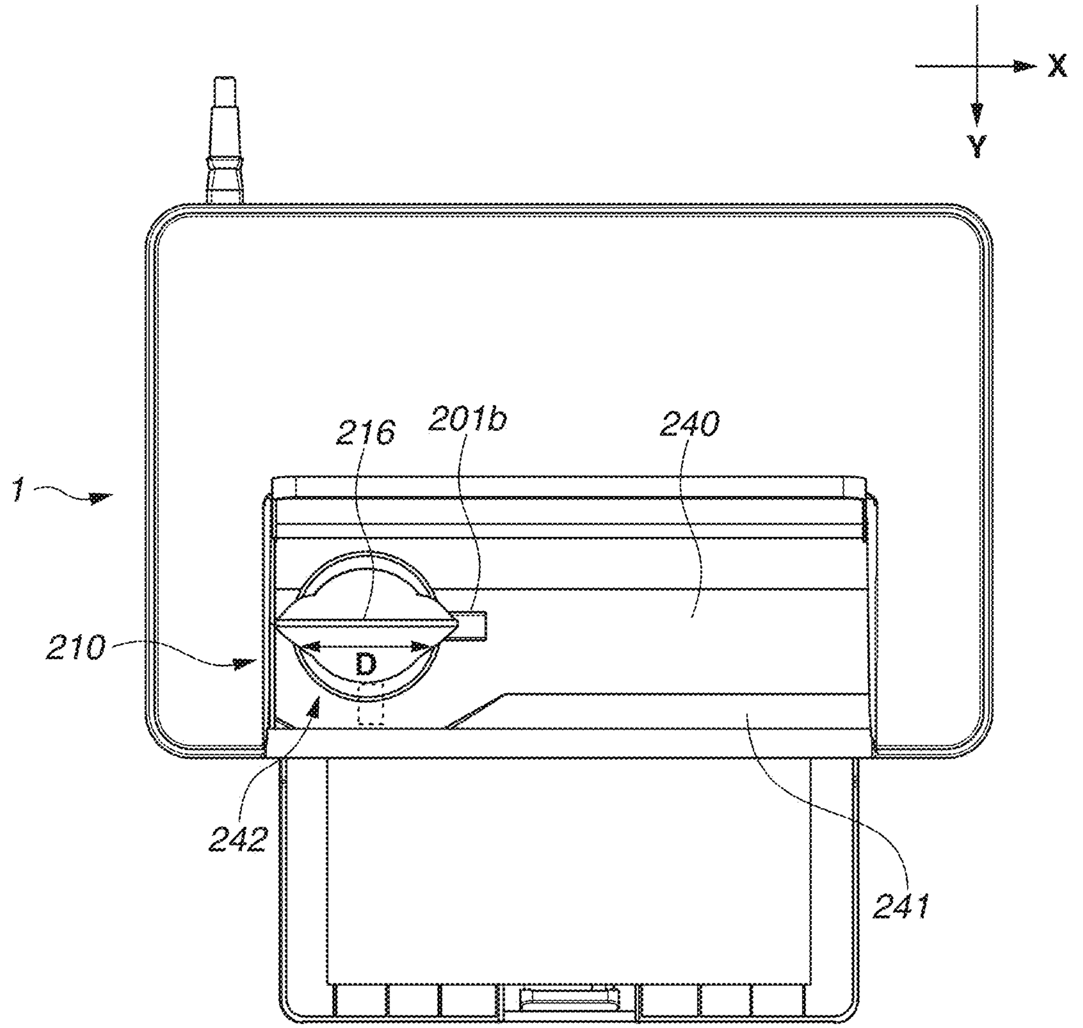
FIG. 11 is a top view of the image forming apparatus.

FIG. 11 is a top view of the image forming apparatus 1. More specifically, FIG. 11 is a top view of the image forming apparatus 1 of in FIG. 10B viewed from above in the vertical direction.

The longitudinal direction D of the pouch end portion 216 is in parallel with the X direction with the replenishment pack 210 attached to the image forming apparatus 1. Further, a protrusion portion 241 protruding in the positive direction in the Z direction (the upper side) is formed on the top surface portion 240 seen by the discharge tray 14 being opened. The protrusion portion 241 is formed at a part of the top surface portion 240. A lever avoidance portion 242 of the top surface portion 240 is located adjacent to the protrusion portion 241 along the rotational path of the lever portion 201*b*. In FIG. 11, the dotted line indicates the lever portion 201*b* located at the initial position.

After the completion of the toner replenishment, the lever portion 201*b* is returned to the initial position. This causes both the main body shutter portion 206 of the replenishment unit 200 and the shutter portion 214 of the replenishment pack 210 to be rotated and the side-surface opening 205 to be covered with the main body shutter portion 206 and the opening 213 to be covered with the shutter portion 214. Then, the lock between the replenishment unit 200 and the replenishment pack 210 is released, which makes the replenishment pack 210 detachable from the replenishment unit 200.

With the replenishment pack 210 not inserted in the replenishment unit 200 of the image forming apparatus 1, the opening 213 is closed with the shutter portion 214, which prevents the toner from leaking out of the replenishment pack 210.

The replenishment pack 210 is detached from the image forming apparatus 1 after the replenishment of the toner is ended. The image forming apparatus 1 can perform the image forming operation with the replenishment pack 210 detached therefrom.

<Movement of Development Unit when Discharge Tray is Opened/Closed>

Next, the movement of the development unit 230 as the discharge tray 14 is opened and closed for developer replenishment will be described with reference to FIGS. 12A to 12C, 13A and 13B, and 14.

As described above, the replenishment pack 210 is received with the toner reception portion 202. In the reception, a force for attaching the replenishment pack 210 acts on the toner reception portion 202 of the development unit 230. Thus, the movement of the development unit 230 in attachment of the replenishment pack 210 can be prevented by a support unit 250, which will be described below, supporting the development unit 230.

In attachment of the replenishment pack 210 to the replenishment unit 200, the discharge tray 14 is opened. In the present exemplary embodiment, the development unit 230 is supported by the support unit 250 in conjunction with the operation of opening the discharge tray 14. This stabilizes the position and orientation of the development unit 230 in attachment of the replenishment pack 210.

Figure 12A:
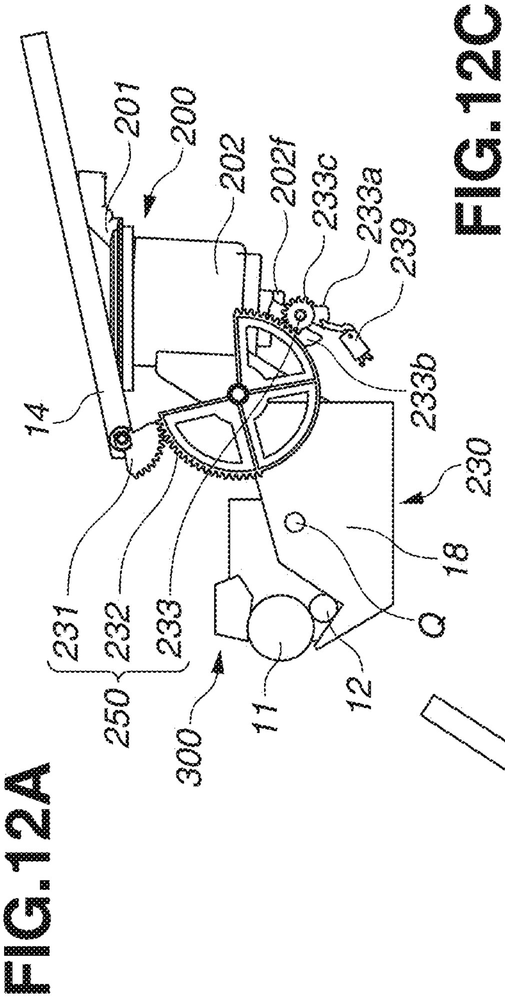
FIGS. 12A to 12C illustrate a support unit according to a first exemplary embodiment.
Figure 12B:
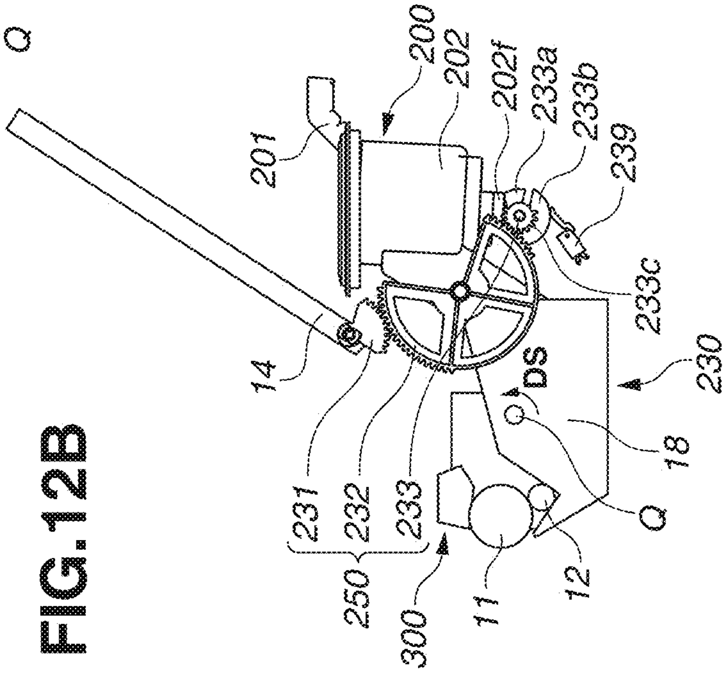
Figure 12C:
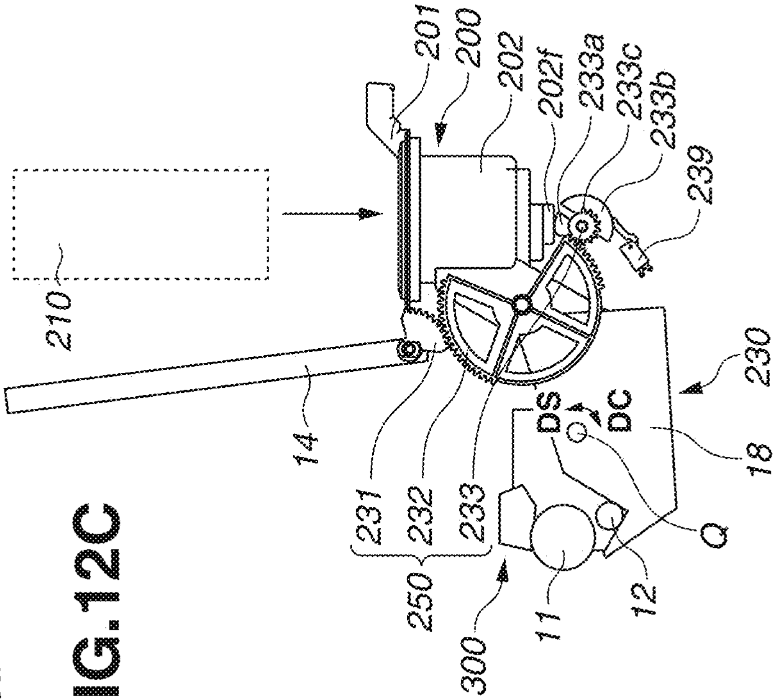

FIGS. 12A to 12C illustrate the support unit 250 according to the present exemplary embodiment. FIG. 12A illustrates the support unit 250 in a retracted state. FIG. 12B illustrates the support unit 250 in a support start state. FIG. 12C illustrates the support unit 250 in a support state. FIGS. 12A to 12C are side views viewed in the direction of the rotational axis of the photosensitive drum 11.

In the present exemplary embodiment, the support unit 250 includes a tray gear (a driving member or a driving gear) 231, an idler gear (an intermediate member) 232, and a support member (a movement member) 233. The tray gear 231 and the idler gear 232 have the function as a coupling portion (a coupling member) to couple the discharge tray 14 and the support member 233 to enable the discharge tray 14 and the support member 233 to operate in conjunction with each other.

The replenishment pack 210 is attached to the toner reception portion 202 from above in the vertical direction. The support member 233 supports the toner reception portion 202 from below in the vertical direction. In the present exemplary embodiment, the support member 233 is positioned below the toner reception portion 202 in the vertical direction.

The support member 233 includes a first cam portion **233*a* as a support portion to support the development unit 230, and a gear portion 233*c* meshed with the idler gear 232**.

The tray gear 231 is fixed to the discharge tray 14, and is rotated in conjunction with the opening/closing of the discharge tray 14. In the present exemplary embodiment, the tray gear 231 is engaged with a shaft provided at the center of the rotation of the discharge tray 14. The support member 233 is coupled with the tray gear 231 via the idler gear 232.

The support member 233 is movable between the support position, at which the support member 233 supports the development unit 230 with the first cam portion **233*a* in contact with the development unit 230, and the retracted position, at which the support member 233 is retracted from the support position. The support member 233 is moved between the support position and the retracted position in conjunction with the movement of the discharge tray 14. The state in which the support member 233 is located at the support position will be referred to as a support state of the support member 233 and the support unit 250. The state in which the support member 233 is located at the retracted position will be referred to as a retracted state of the support member 233 and the support unit 250**.

When the discharge tray 14 is located at the exposing position, the support member 233 and the support unit 250 are in the support state, and the support member 233 is located at the support position. When the discharge tray 14 is located at the cover position, the support member 233 and the support unit 250 are in the retracted state, and the support member 233 is located at the retracted position.

The support member 233 at the support position supports the development unit 230. In this state, the development roller 12 is separated from the photosensitive drum 11 in the present exemplary embodiment.

With the support member 233 at the retracted position, the first cam portion **233*a* of the support member 233 is separated from the development unit 230 in the present exemplary embodiment. In addition, the development roller 12 is positioned where the development roller 12 can develop the electrostatic latent image formed on the photosensitive drum 11 (the position at which the development roller 12 is in contact with the photosensitive drum 11 in the present exemplary embodiment). If the development roller 12 can develop the electrostatic latent image, the support member 233 and the development unit 230 may be in contact with each other with the support member 233** at the retracted position.

The control unit 199 of the image forming apparatus 1 permits the image forming operation with the support member 233 at the retracted position. In the present exemplary embodiment, the control unit 199 restricts the image forming operation with the support member 233 at the support position.

In other words, the control unit 199 permits the image forming operation with the discharge tray 14 at the cover position. In the present exemplary embodiment, the control unit 199 restricts the image forming operation with the discharge tray 14 at the exposing position.

The image forming apparatus 1 includes an opening/closing sensor (an output unit, or a detection unit) 239 configured to output a signal corresponding to a position of at least one of the support member 233 or the discharge tray 14. As the discharge tray 14 and the support member 233 operate in conjunction with each other, the opening/closing sensor 239 can output a signal corresponding to the position of the support member 233 and can also output a signal corresponding to the position of the discharge tray 14. Thus, the detection of one of the positions of the discharge tray 14 and the support member 233 using the opening/closing sensor 239 enables the detection of the position of the other. In the present exemplary embodiment, the control unit 199 is configured to permit or restrict the image forming operation based on the output (the signal) of the opening/closing sensor 239.

As will be described below, a detection target portion (a detection target) of the opening/closing sensor 239 is included in the support member 233 in the present exemplary embodiment. However, where the detection target portion of the opening/closing sensor 239 is disposed is not limited thereto. For example, the detection target portion may be disposed at a part of the support unit 250 or the discharge tray 14.

In the present exemplary embodiment, the opening/closing sensor 239 is a sensor configured to switch between an ON state with the discharge tray 14 opened and an OFF state with the discharge tray 14 closed. The opening/closing sensor 239 is switched to the ON state by being put in contact with a second cam portion (a contact portion, the detection target portion, or the detection target) 233*b* included in the support member 233, and to the OFF state by being separated from the second cam portion 233*b*.

Besides the type of sensor to come in contact with the detection target, a type of sensor that does not come in contact with the detection target can also be used as the opening/closing sensor 239.

A support target portion 202*f* is included in the toner reception portion 202. As described above, when the discharge tray 14 is closed, the first cam portion 233*a* of the support member 233 is separated from the support target portion 202*f* of the development unit 230 (refer to FIG. 12A). In that state, the development unit 230 is located at a unit contact position, at which the development roller 12 is in contact with the photosensitive drum 11. The state with the first cam portion 233*a* separated from the support target portion 202*f* provides a stable contact condition between the photosensitive drum 11 and the development roller 12, under which the development roller 12 is ready to develop the electrostatic latent image.

As illustrated in FIG. 12A, the opening/closing sensor 239 and the second cam portion 233*b* are separated from each other with the discharge tray 14 at the cover position and when the support member 233 is located at the retracted position. In that state, the signal of the opening/closing sensor 239 is in the OFF state (a first state), and the control unit 199 permits the image forming operation.

As illustrated in FIG. 12C, the opening/closing sensor 239 is in contact with the second cam portion 233*b* when the discharge tray 14 is located at the exposing position and the support member 233 is located at the support position. In that state, the signal of the opening/closing sensor 239 is in the ON state (a second state). The second state is different from the first state. In the second state, the control unit 199 restricts the image forming operation. In other words, the control unit 199 causes the image forming apparatus 1 to prohibit the image forming apparatus 1 from starting the image forming operation with the opening/closing sensor 239 in the ON state.

The angle between the positions of the discharge tray 14 opened from the cover position and the discharge tray 14 located at the cover position is referred to as an opening angle of the discharge tray 14. As illustrated in FIG. 12B, the first cam portion 233*a* included in the support member 233 is in contact with the development unit 230 at a predetermined opening angle (45° in the present exemplary embodiment) of the discharge tray 14. In other words, the support member 233 starts supporting the development unit 230, and the development unit 230 starts moving relative to the photosensitive unit 300.

In the present exemplary embodiment, the development unit 230 is rotatable on a rotational shaft Q via which the development unit 230 is coupled with the photosensitive unit 300. The cam portion 233*a* presses to move the development unit 230 in a direction DS in which the development roller 12 is being separated from the photosensitive drum 11.

On the other hand, the support member 233 does not support the development unit 230 at an opening angle smaller than 45° of the discharge tray 14, with the photosensitive drum 11 and the development roller 12 kept in the contact state. This keeps the photosensitive drum 11 and the development roller 12 in the contact state at an opening angle smaller than 45° of the discharge tray 14 even with the discharge tray 14 opened due to, for example, an operation of removing a recording medium P by the user or vibration.

The position of the discharge tray 14 at which the signal of the opening/closing sensor 239 is switched between the first state (the OFF state) and the second state (the ON state) is referred to as an intermediate position of the discharge tray 14. In other words, the signal of the opening/closing sensor 239 is switched between the OFF state and the ON state when the discharge tray 14 is located at the intermediate position between the cover position and the exposing position.

The second cam portion 233*b* is configured to come in contact with the opening/closing sensor 239 at an opening angle smaller than 45° of the discharge tray 14 and to cause the opening/closing sensor 239 to be switched between the OFF state and the ON state. In other words, with the discharge tray 14 at the intermediate position, the development roller 12 is in contact with the photosensitive drum 11. When the discharge tray 14 is moved from the cover position to the exposing position, the development roller 12 is separated from the photosensitive drum 11 after the signal of the opening/closing sensor 239 is switched from the OFF state to the ON state.

That configuration allows the control unit 199 to detect movement of the discharge tray 14 and the support member 233 before the development roller 12 is separated from the photosensitive drum 11 based on the state of the signal of the opening/closing sensor 239. As the control unit 199 restricts the image forming operation with the opening/closing sensor 239 in the ON state, the image forming operation is restricted with the support member 233 supporting the development unit 230. In the present exemplary embodiment, the image forming operation is restricted with the photosensitive drum 11 and the development roller 12 separated from each other.

The opening angle at which the support member 233 starts supporting the development unit 230 (a support start angle) is not limited to 45°, and the support start angle may be larger than 45° or may be smaller than 45°. For continuous image forming operation even with the discharge tray 14 moved at some degree, it is suitable that the support start angle is larger than 10°, and it is more suitable that the support start angle is larger than 30°.

As illustrated in FIG. 12C, with the discharge tray 14 opened at a predetermined angle (75° in the present exemplary embodiment), the replenishment unit 200 is exposed, and the first cam portion 233*a* included in the support member 233 supports the development unit 230.

The opening angle of the discharge tray 14 with the discharge tray 14 at the exposing position is not limited to 75°, and may be larger than 75° or may be smaller than 75°. It is suitable that the discharge tray 14 is held at the exposing position with no external force acting on the discharge tray 14.

when the discharge tray 14 is opened (at the exposing position), the support member 233 is at the support position, and the development unit 230 is at a unit retracted position, at which the development unit 230 is retracted from the unit contact position, the development roller 12 being separated from the photosensitive drum 11 in the present exemplary embodiment. In that state, the toner reception portion 202 is engaged with the attachment portion 201, and the user can attach the replenishment pack 210 to the replenishment unit 200 and replenish the toner.

In attachment of the replenishment pack 210 to the toner reception portion 202 by the user, a force acts on the development unit 230 in a direction DC to move the development roller 12 toward the photosensitive drum 11. At this time, the support member 233 supports the development unit 230, stabilizing the position and orientation of the development unit 230, thereby providing a stable attachment of the replenishment pack 210.

Further, the configuration according to the present exemplary embodiment prevents the development roller 12 from being pressed against the photosensitive drum 11 in attachment of the replenishment pack 210.

Figure 13A:
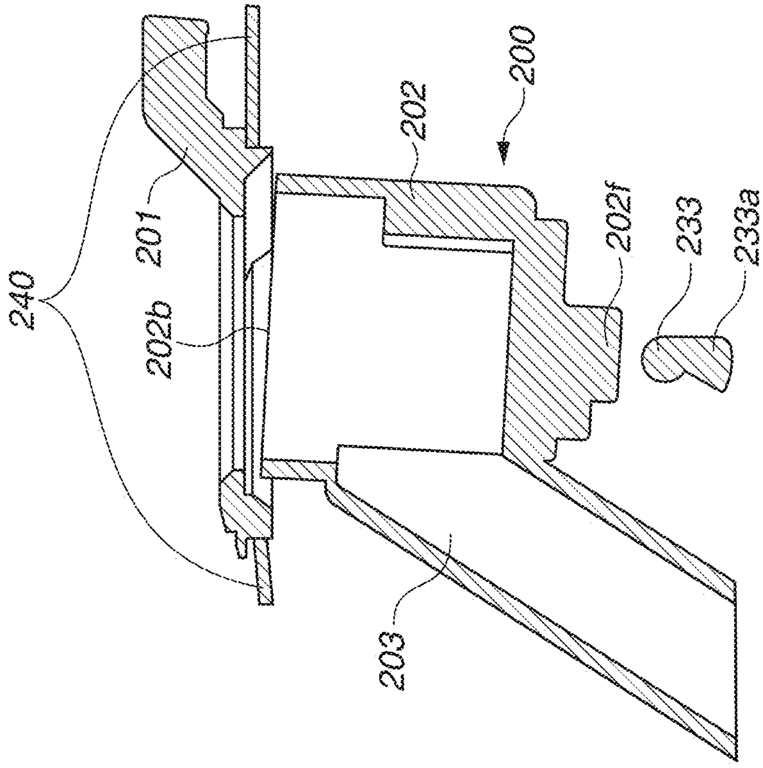
FIGS. 13A and 13B are cross-sectional views illustrating the operation of a support member according to the first exemplary embodiment.
Figure 13B:
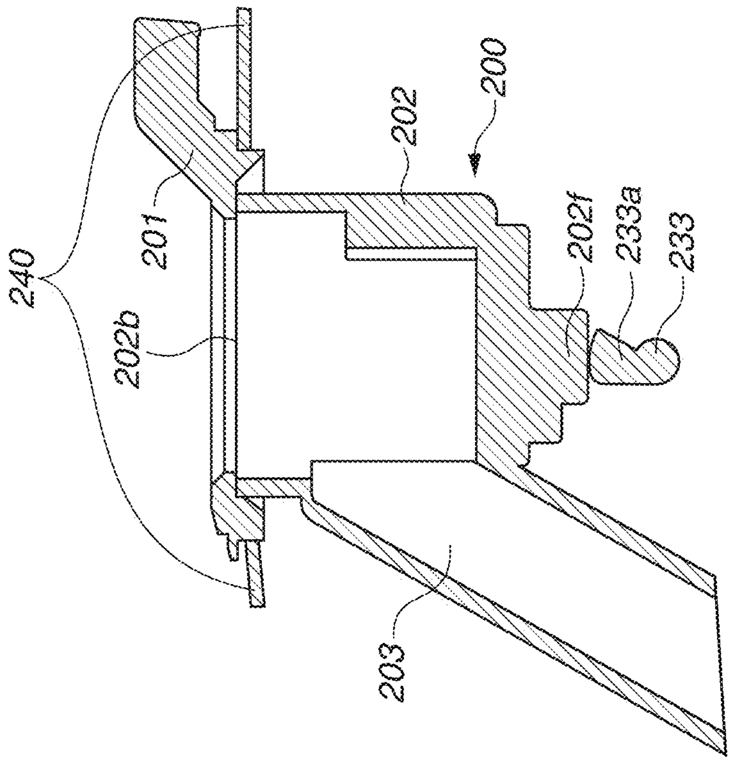

FIGS. 13A and 13B are cross-sectional views illustrating the operation of the support member 233 on the replenishment unit 200. FIGS. 13A and 13B are side views in the direction of the rotational axis of the photosensitive drum 11. FIG. 13A is a cross-sectional view illustrating the relationship between the toner reception portion 202, the attachment portion 201, and the support member 233 with the support member 233 at the retracted position. FIG. 13B is a cross-sectional view illustrating the relationship between the toner reception portion 202, the attachment portion 201, and the support member 233 with the support member 233 at the support position.

As illustrated in FIG. 13A, the first cam portion 233*a* included in the support member 233 is out of contact with the support target portion 202*f* with the discharge tray 14 closed, located at the cover position. In that state, the development roller 12 is in contact with the photosensitive drum 11. That configuration prevents the development unit 230 from being pushed by the support member 233 as the toner borne on the development roller 12 is supplied to the photosensitive drum 11, offering a stable image forming operation by the development roller 12.

On the other hand, as illustrated in FIG. 13B, the support target portion 202*f* is supported by the first cam portion 233*a* with the discharge tray 14 opened by 75° from the cover position, located at the exposing position. In the state, the user can attach the replenishment pack 210 to the replenishment unit 200 and replenish the toner.

As described above, the movement of the discharge tray 14 to the exposing position causes the support member 233 to be moved from the retracted position to the support position. The toner reception portion 202 is moved in the direction toward the attachment portion 201 simultaneously. Further, in the present exemplary embodiment, a contact portion 202*b* included in the toner reception portion 202 comes in contact with the attachment portion 201. That configuration stabilizes the position of the toner reception portion 202, thereby facilitating insertion and pulling of the replenishment pack 210 into and out of the replenishment inlet 204, promoting the replenishment operation.

Figure 14:
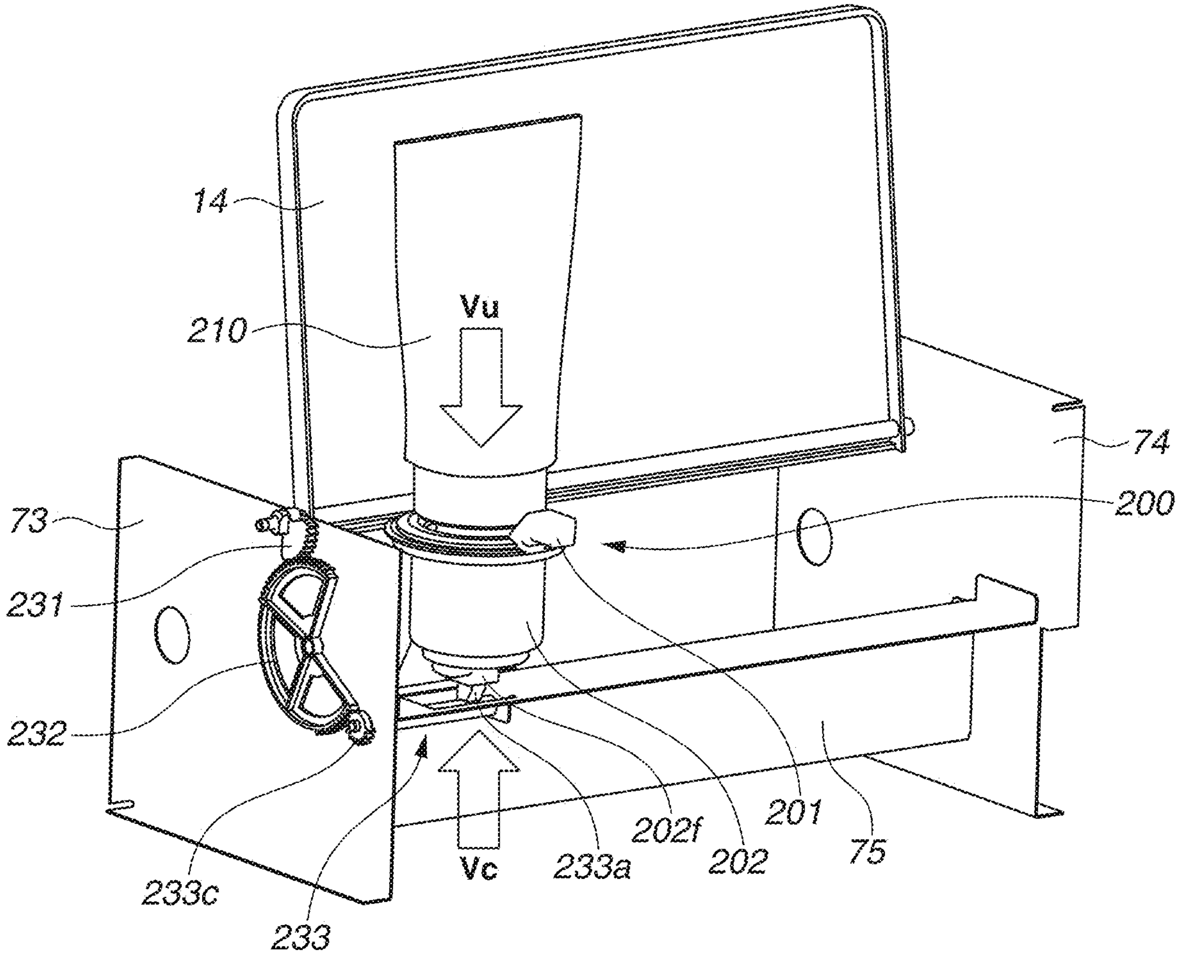
FIG. 14 is a perspective view illustrating the support configuration of the support unit according to the first exemplary embodiment.

FIG. 14 is a perspective view illustrating the support configuration of the support unit 250. The support unit 250, which includes the tray gear 231, the idler gear 232, and the support member 233, is securely supported on the left-side plate (a first frame) 73 and a front-side plate (a front frame or a second frame) 75. The front-side plate 75 is also supported by a right-side plate 74 placed opposite to the left-side plate 73. In the present exemplary embodiment, the left-side plate frame 73, the front frame 75, and the right-side plate 74 are made of metallic plates.

To replenish the toner with the discharge tray 14 opened, the user applies a force Vu to the toner reception portion 202 in the attachment direction of the replenishment pack 210. The support member 233 is moved from the retracted positon to the support position to press the development unit 230 to move the toner reception portion 202 in the direction opposite to the attachment direction of the replenishment pack 210. The toner reception portion 202 supported by the support member 233 receives a reaction force (a force supporting the toner reception portion 202) Vc from the support unit 250.

Viewed in the vertical direction, at least a part of the support member 233 overlaps the toner reception portion 202. Similarly, viewed in the direction of attaching the replenishment pack 210 to the toner reception portion 202, at least a part of the support member 233 overlaps the toner reception portion 202. More specifically, the first cam portion 233*a* overlaps the toner reception portion 202 in the present exemplary embodiment.

In the present exemplary embodiment, the support member 233 is disposed to support the vicinity of the center of the toner reception portion 202. The replenishment pack 210 attached to the toner reception portion 202 overlaps at least a part of the support member 233 viewed in the vertical direction. Similarly, the replenishment pack 210 attached to the toner reception portion 202 overlaps at least a part of the support member 233 viewed in the direction of attaching the replenishment pack 210 to the toner reception portion 202. More specifically, the first cam portion 233*a* overlaps the replenishment pack 210 in the present exemplary embodiment.

That configuration allows the support member 233 to more reliably receive the force applied to the toner reception portion 202 in attachment of the replenishment pack 210.

As described above, the development unit 230 is supported by the support member 233 with the discharge tray 14 at the exposing position, stabilizing the position and orientation of the development unit 230. This offers a stable attachment of the replenishment pack 210 to the image forming apparatus 1. Further, even when the force for attaching the replenishment pack 210 is applied to press the development roller 12 against the photosensitive drum 11, the force for attaching the replenishment pack 210 can be received by the support member 233. This prevents the force caused by the attachment of the replenishment pack 210 from acting on the photosensitive drum 11 via the development roller 12.

On the other hand, the discharge tray 14 is at the cover position in the image formation. In the state, the support member 233 is at the retracted position, allowing the development roller 12 to be positioned relative to the photosensitive drum 11 with accuracy. This prevents the influence of the support member 233 on the development of the electrostatic latent image by the development roller 12.

A second exemplary embodiment will be described with reference to FIGS. 15A and 15B. In the second exemplary embodiment, a support unit 251 will be described as a modification of the configuration of the support unit 250 according to the first exemplary embodiment. Descriptions and illustrations of the configuration similar to that described in the first exemplary embodiment will be omitted, and like numbers refer to like elements in the drawings.

Figure 15A:
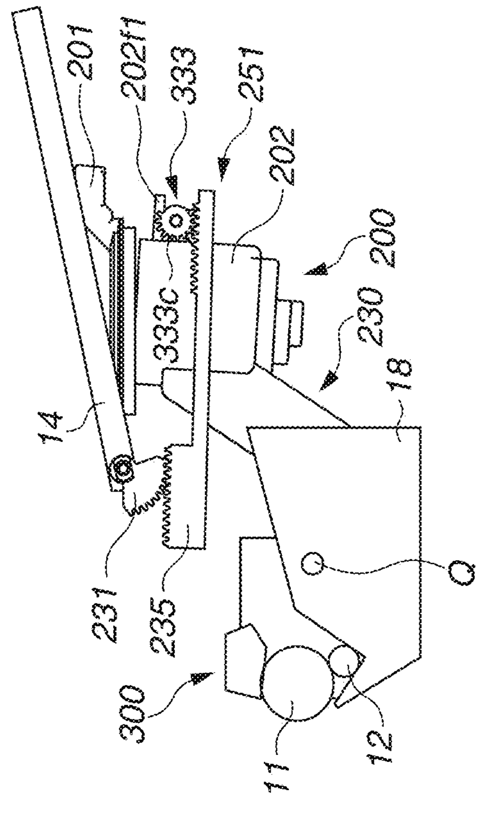
FIGS. 15A and 15B illustrate a support unit according to a second exemplary embodiment.
Figure 15B:
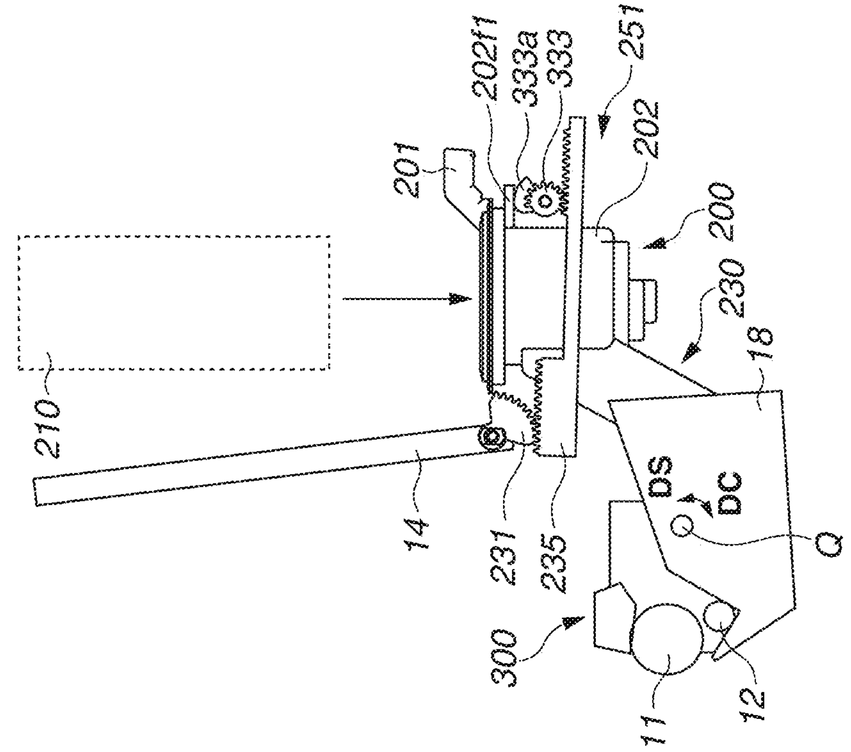

FIGS. 15A and 15B illustrate the support unit 251 according to the present exemplary embodiment. FIG. 15A illustrates the support unit 251 with the discharge tray 14 at the cover position. FIG. 15B illustrates the support unit 251 with the discharge tray 14 at the exposing position. FIGS. 15A and 15B are side views in the direction of the rotational axis of the photosensitive drum 11.

The support unit 251 corresponds to the support unit 250 according to the first exemplary embodiment. The support unit 251 includes a rack gear 235 corresponding to the idler gear 232 according to the first exemplary embodiment, and a support member 333 corresponding to the support member 233 according to the first exemplary embodiment. The rack gear 235 and the tray gear 231 have the function as a coupling member that couples the discharge tray 14 and the support member 333.

The toner reception portion 202 includes a support target portion **202*f*1. The support member 333 includes a first cam portion 333*a* as a support portion that supports the development unit 230, and a gear portion 333*c*, which is meshed with the rack gear 235**.

The support unit 251 is supported by the left-side plate frame 73 and the front frame 75 similarly to the support unit 250 according to the first exemplary embodiment.

As illustrated in FIG. 15A, the support member 333 is at the retracted position with the discharge tray 14 at the cover position. In that state, the first cam portion **333*a* is separated from the support target portion 202*f*1 of the development unit 230. Then, the photosensitive drum 11 and the development roller 12** are in contact with each other.

As illustrated in FIG. 15B, the replenishment unit 200 is exposed with the discharge tray 14 at the exposing position. In that state, the support member 333 is at the support position, and the first cam portion **333*a* supports the support target portion 202*f*1 of the development unit 230. In addition, the photosensitive drum 11 and the development roller 12 are separated from each other. Further, the toner reception portion 202 is engaged with the attachment portion 201**, and the user can replenish the toner.

Similarly to the first exemplary embodiment, the position of the discharge tray 14 or the support member 333 can also be detected by the opening/closing sensor 239.

A third exemplary embodiment will be described with reference to FIGS. 16A and 16B. In the third exemplary embodiment, a support unit 252 will be described as a modification of the configuration of the support unit 250 according to the first exemplary embodiment. Descriptions and illustrations of the configuration similar to that described in the first exemplary embodiment will be omitted, and like numbers refer to like elements in the drawings.

Figure 16B:
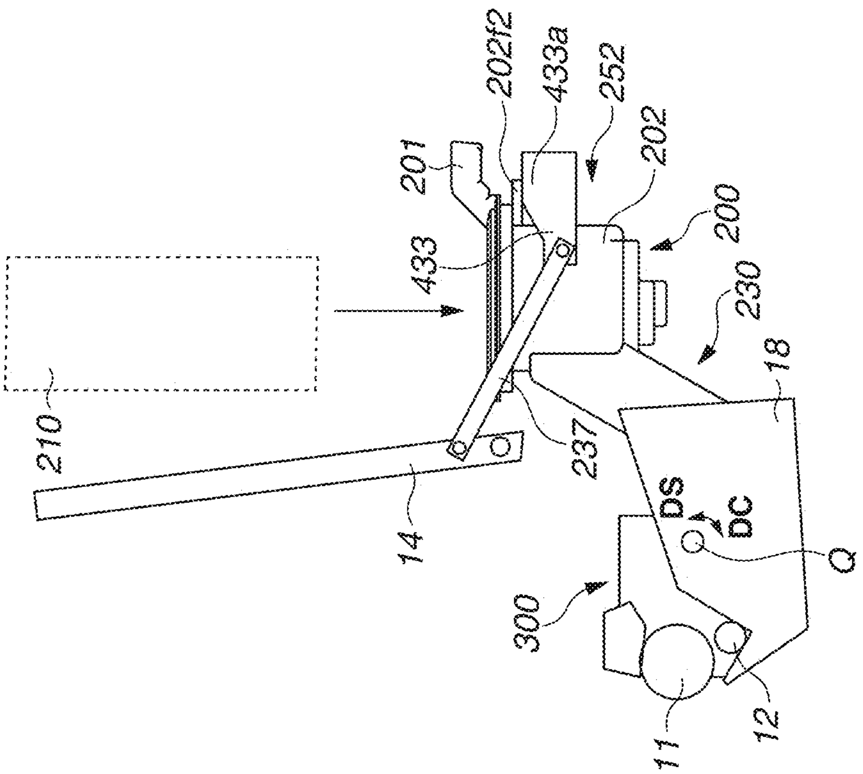
FIGS. 16A and 16B illustrate a support unit according to a third exemplary embodiment.
Figure 16A:
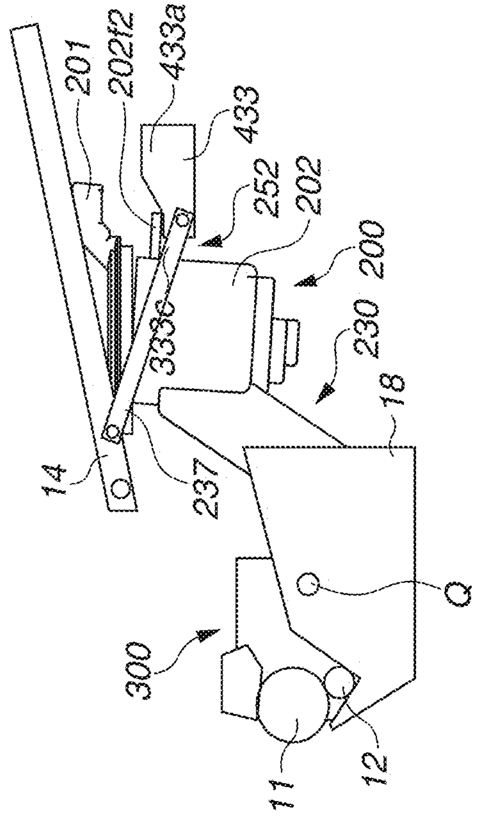

FIGS. 16A and 16B illustrate the support unit 252 according to the present exemplary embodiment. FIG. 16A illustrates the support unit 252 with the discharge tray 14 at the cover position. FIG. 16B illustrates the support unit 252 with the discharge tray 14 at the exposing position. FIGS. 16A and 16B are side views in the direction of the rotational axis of the photosensitive drum 11.

The support unit 252 corresponds to the support unit 250 according to the first exemplary embodiment. The support unit 252 includes a support member 433 corresponding to the support member 233 according to the first exemplary embodiment, and a link 237 as a coupling member that couples the discharge tray 14 and the support member 433.

The toner reception portion 202 includes a support target portion **202*f*2. The support member 433 includes a support portion 433*a*, which supports the development unit 230**.

The support unit 252 is securely supported by the left-side plate frame 73 and the front frame 75 similarly to the support unit 250 according to the first exemplary embodiment.

As illustrated in FIG. 16A, the support member 433 is located at the retracted position with the discharge tray 14 at the cover position. In that state, the support portion **433*a* is separated from the support target portion 202*f*2 of the development unit 230. In addition, the photosensitive drum 11 and the development roller 12** are in contact with each other.

As illustrated in FIG. 16B, the replenishment unit 200 is exposed with the discharge tray 14 at the exposing position. In that state, the support member 433 is located at the support position, with the support portion **433*a* supporting the support target portion 202*f*2 of the development unit 230. In addition, the photosensitive drum 11 and the development roller 12 are separated from each other. Further, the toner reception portion 202 is engaged with the attachment portion 201**, and the user can replenish the toner.

Similarly to the first exemplary embodiment, the position of the discharge tray 14 or the support member 433 can also be detected by the opening/closing sensor 239.

A fourth exemplary embodiment will be described with reference to FIGS. 17A and 17B. In the fourth exemplary embodiment, descriptions and illustrations of the configuration similar to that described in the first exemplary embodiment will be omitted, and like numbers refer to like elements in the drawings.

Figure 17B:
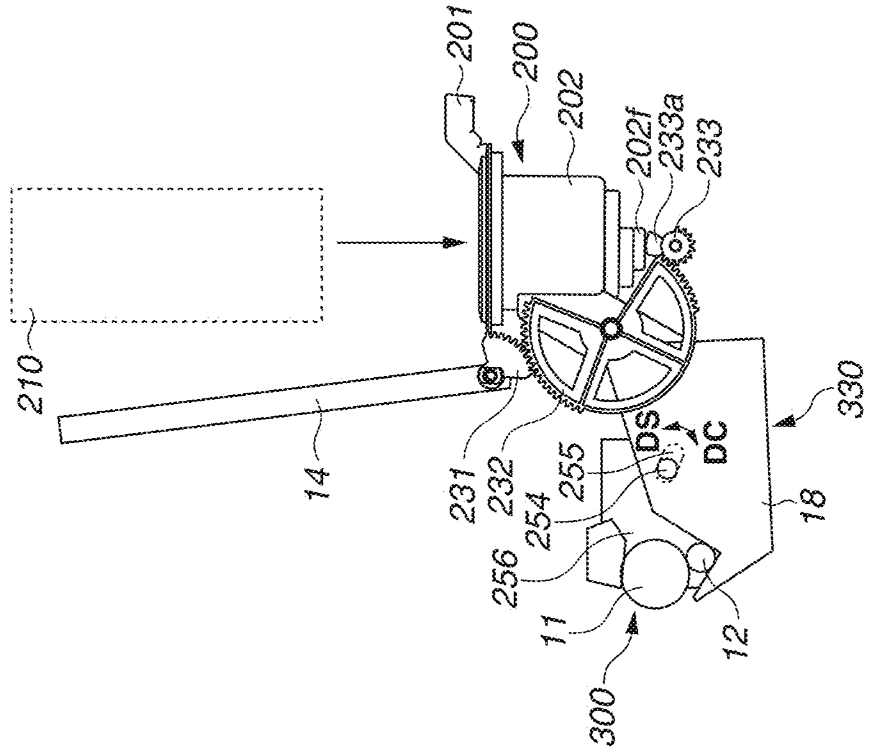
FIGS. 17A and 17B illustrate a support unit according to a fourth exemplary embodiment.
Figure 17A:
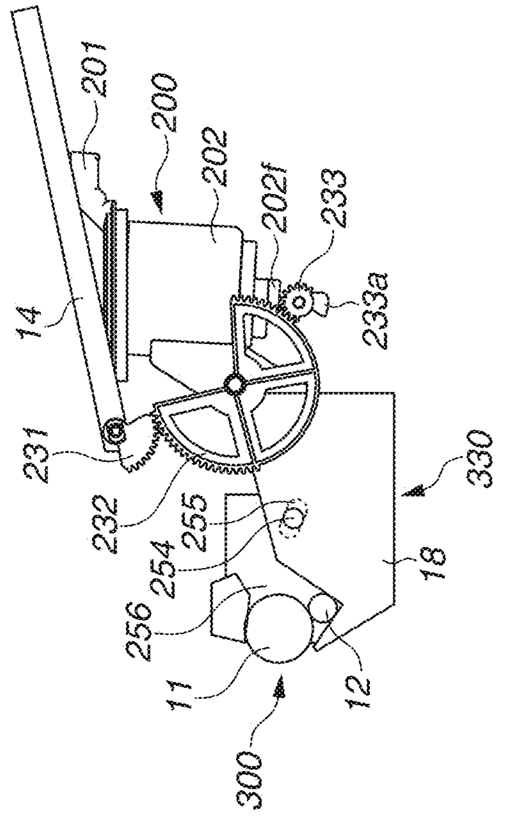

FIGS. 17A and 17B illustrate a development unit 330 according to the present exemplary embodiment. FIG. 17A illustrates the development unit 330 with the discharge tray 14 at the cover position. FIG. 17B illustrates the development unit 330 with the discharge tray 14 at the exposing position. FIGS. 17A and 17B are side views in the direction of the rotational axis of the photosensitive drum 11.

The development unit 330 according to the present exemplary embodiment corresponds to the development unit 230 according to the first exemplary embodiment. In the present exemplary embodiment, the photosensitive unit 300 and the development unit 330 are coupled with each other by the engagement of a shaft included in either the photosensitive unit 300 or the development unit 330 with an elongated hole in the other.

More specifically, the development unit 330 includes a holding shaft (a shaft) 254. The photosensitive unit 300 includes the side cover 256, and the side cover 256 has an elongated hole 255. The holding shaft 254 is put in the elongated hole 255. The photosensitive unit 300 may include a shaft corresponding to the holding shaft 254 and the development unit 330 may include a hole corresponding to the elongated hole 255.

In the development unit 230 according to the first exemplary embodiment, the development roller 12 and the photosensitive drum 11 are separated from each other with the support member 233 at the support position. On the other hand, the development roller 12 in the development unit 330 according to the present exemplary embodiment is not separated from the photosensitive drum 11 with the support member 233 at the support position.

As illustrated in FIG. 17A, the first cam portion **233*a* included in the support member 233 is separated from the toner reception portion 202 with the discharge tray 14** at the cover position.

As illustrated in FIG. 17B, the replenishment unit 200 is exposed with the discharge tray 14 at the exposing position. In that state, the support member 233 is located at the support position, and the first cam portion **233*a* supports the support target portion 202*f* of the development unit 330**.

At this time, the holding shaft 254 moves and rotates in the elongated hole 255, which allows the first cam portion **233*a* to raise the toner reception portion 202 while the photosensitive drum 11 and the development roller 12** are kept in the contact state.

In this configuration, the force that the user applies in the attachment direction of the replenishment pack 210 can also be received with the support unit 250 when the toner is replenished with discharge tray 14 opened.

That configuration stabilizes the position and orientation of the development unit 330 in the attachment of the replenishment pack 210. Further, this prevents the development roller 12 from being pressed against the photosensitive drum 11. Further, whether the discharge tray 14 is opened or closed, the photosensitive drum 11 and the development roller 12 is kept in the contact state.

Similarly to the first exemplary embodiment, the position of the discharge tray 14 or the support member 233 can also be detected by the opening/closing sensor 239.

(Exemplary Modifications)

The development unit 230 or the development unit 330 is movably coupled with the photosensitive unit 300 in each of the above-described exemplary embodiments, but the present disclosure is not limited thereto. In other words, the development unit can also be configured not to be coupled with the photosensitive unit 300. The development unit and the photosensitive unit 300 may be supported independently of each other inside the housing 72.

According to the present disclosure, the image forming apparatus is provided that allows the replenishment container to be stably attached.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus configured to perform an image forming operation on a recording medium, the image forming apparatus comprising:

a drum unit including a photosensitive drum;

a development unit configured to be movable relative to the drum unit, the development unit including a development roller;

a housing containing the drum unit and the development unit, the housing including an opening/closing member, the opening/closing member being movable between a closed position and an opened position;

a support member configured to be movable between a support position, at which the support member supports the development unit, and a retracted position, at which the support member is retracted from the support position, in conjunction with the movement of the opening/closing member; and an output unit configured to output a signal corresponding to a position of at least one of the support member and the opening/closing member, wherein the support member is located at the support position when the opening/closing member is located at the opened position, and the support member is located at the retracted position when the opening/closing member is located at the closed position, and wherein the development unit is located at a unit contact position, at which the development roller is in contact with the photosensitive drum, when the support member is located at the retracted position, and the development unit is located at a unit retracted position, at which the development unit is retracted from the unit contact position, when the support member is located at the support position.

2. The image forming apparatus according to claim 1, wherein the development unit is movably coupled with the drum unit.

3. The image forming apparatus according to claim 1, wherein the opening/closing member includes a stacking portion on which the recording medium discharged from the housing is stacked.

4. The image forming apparatus according to claim 1, further comprising a control unit configured to permit the execution of the image forming operation with the support member located at the retracted position.

5. The image forming apparatus according to claim 4, wherein the control unit is configured to restrict the execution of the image forming operation with the support member located at the support position.

6. The image forming apparatus according to claim 4, wherein the control unit is configured to restrict the execution of the image forming operation with the opening/closing member located at the opened position.

7. The image forming apparatus according to claim 4, wherein the control unit is configured to permit the execution of the image forming operation when the signal is in a first state, and restrict the execution of the image forming operation when the signal is in a second state.

8. The image forming apparatus according to claim 7, wherein the first state and the second state are switched when the opening/closing member is located at an intermediate position between the closed position and the opened position.

9. The image forming apparatus according to claim 8, wherein the development roller is in contact with the photosensitive drum when the opening/closing member is located at the intermediate position.

10. The image forming apparatus according to claim 1, wherein the development roller is separated from the photosensitive drum with the development unit at the unit retracted position.

11. The image forming apparatus according to claim 1, wherein the development roller is in contact with the photosensitive drum with the development unit located at the unit retracted position.

12. The image forming apparatus according to claim 1, wherein the development unit includes a reception portion to which a replaceable unit is detachably attached, and wherein the opening/closing member covers the reception portion when the opening/closing member is at the closed position, and the reception portion is exposed when the opening/closing member is at the opened position.

13. The image forming apparatus according to claim 12, wherein the reception portion is configured so that the replaceable unit is attached thereto from above in a vertical direction, and wherein the support member supports the reception portion from below the reception portion in the vertical direction.

14. The image forming apparatus according to claim 13, wherein at least a part of the support member is disposed at a position to overlap the reception portion, viewed in the vertical direction.

15. The image forming apparatus according to claim 12, wherein the image forming apparatus is configured to perform the image forming operation in a state where the replaceable unit is detached therefrom.

16. The image forming apparatus according to claim 12, wherein the reception portion is a portion to which the replaceable unit is inserted.

17. The image forming apparatus according to claim 12, wherein the reception portion is arranged such that a force acts on the development unit in a direction to move the development roller toward the photosensitive drum in attachment of the replaceable unit to the reception portion.

18. The image forming apparatus according to claim 1, further comprising a shaft included in one of the development unit and the drum unit; and an elongated hole included in the other of the development unit and the drum unit, the shaft being to be inserted in the elongated hole.

19. The image forming apparatus according to claim 1, wherein, when the opening/closing member moves from the closed position to the opened position, the supporting member moves from the retracted position to the supporting position and the supporting member moves the development unit in a direction in which the development roller is being separated from the photosensitive drum.

* * * * *